(12) United States Patent
Lien et al.

(10) Patent No.: US 10,782,390 B2
(45) Date of Patent: Sep. 22, 2020

(54) FULL-DUPLEX OPERATION FOR RADAR SENSING USING WIRELESS COMMUNICATION CHIPSET

(71) Applicant: Google LLC, Mountain View, CA (US)

(72) Inventors: Jaime Lien, Mountain View, CA (US); Changzhan Gu, Milpitas, CA (US)

(73) Assignee: Google LLC, Mountain View, CA (US)

( * ) Notice: Subject to any disclaimer, the term of this patent is extended or adjusted under 35 U.S.C. 154(b) by 148 days.

(21) Appl. No.: 15/928,346

(22) Filed: Mar. 22, 2018

(65) Prior Publication Data

US 2018/0348340 A1 Dec. 6, 2018

Related U.S. Application Data

(60) Provisional application No. 62/512,952, filed on May 31, 2017.

(51) Int. Cl.
| | |
|---|---|
| G01S 7/03 | (2006.01) |
| G01S 13/58 | (2006.01) |
| G01S 13/34 | (2006.01) |
| H04W 88/06 | (2009.01) |
| G01S 7/28 | (2006.01) |

(Continued)

(52) U.S. Cl.
CPC ............ *G01S 7/034* (2013.01); *G01S 7/285* (2013.01); *G01S 7/2813* (2013.01); *G01S 7/352* (2013.01); *G01S 13/06* (2013.01); *G01S 13/34* (2013.01); *G01S 13/581* (2013.01); *H04B 1/44* (2013.01); *H04L 5/14* (2013.01); *H04W 88/06* (2013.01); *G01S 2013/0245* (2013.01)

(58) Field of Classification Search
CPC ...... G01S 13/325; G01S 13/87; G01S 13/931; G01S 2007/358; G01S 2013/936; G01S 2013/9375; G01S 2013/9378; G01S 7/282; G01S 7/352
See application file for complete search history.

(56) References Cited

U.S. PATENT DOCUMENTS

| | | | |
|---|---|---|---|
| 4,843,351 A | 6/1989 | Edwards et al. | |
| 4,912,477 A | 3/1990 | Lory et al. | |

(Continued)

FOREIGN PATENT DOCUMENTS

| | | |
|---|---|---|
| CN | 1529970 | 9/2004 |
| CN | 1894981 | 1/2007 |

(Continued)

OTHER PUBLICATIONS

"Foreign Office Action", Taiwanese Application No. 107107979, dated Oct. 16, 2018, 9 pages.

(Continued)

*Primary Examiner* — Timothy X Pham
(74) *Attorney, Agent, or Firm* — Colby Nipper PLLC

(57) ABSTRACT

Techniques and apparatuses are described that enable full-duplex operation for radar sensing using a wireless communication chipset. A controller initializes or controls connections between one or more transceivers and antennas in the wireless communication chipset. This enables the wireless communication chipset to be used as a continuous-wave radar or a pulse-Doppler radar. By utilizing these techniques, the wireless communication chipset can be re-purposed or used for wireless communication or radar sensing.

20 Claims, 16 Drawing Sheets

(51) Int. Cl.

| | |
|---|---|
| G01S 7/285 | (2006.01) |
| G01S 7/35 | (2006.01) |
| G01S 13/06 | (2006.01) |
| H04B 1/44 | (2006.01) |
| H04L 5/14 | (2006.01) |
| G01S 13/02 | (2006.01) |

(56) References Cited

U.S. PATENT DOCUMENTS

| | | |
|---|---|---|
| 6,633,254 B1 | 10/2003 | Sutphin |
| 6,671,496 B1 | 12/2003 | Hoshi |
| 7,092,690 B2 | 8/2006 | Zancewicz |
| 7,142,829 B2 | 11/2006 | Sung et al. |
| 8,798,695 B1 | 8/2014 | Zheng et al. |
| 9,086,476 B1 * | 7/2015 | Schuss ................... G01S 7/038 |
| 9,689,967 B1 | 6/2017 | Stark et al. |
| 10,247,809 B2 | 4/2019 | Testar et al. |
| 2003/0179138 A1 | 9/2003 | Chen |
| 2007/0200747 A1 | 8/2007 | Okai et al. |
| 2008/0204322 A1 | 8/2008 | Oswald et al. |
| 2009/0180466 A1 | 7/2009 | Soul et al. |
| 2009/0323782 A1 | 12/2009 | Baker et al. |
| 2010/0245091 A1 | 9/2010 | Margon |
| 2011/0074621 A1 | 3/2011 | Wintermantel |
| 2011/0140949 A1 | 6/2011 | Lee |
| 2011/0267958 A1 | 11/2011 | Sekiya et al. |
| 2012/0001802 A1 | 1/2012 | Grau Besoli et al. |
| 2012/0092205 A1 | 4/2012 | Bourdelais et al. |
| 2012/0146796 A1 | 6/2012 | Kenneth et al. |
| 2013/0069816 A1 | 3/2013 | Ash et al. |
| 2016/0054436 A1 | 2/2016 | Lee et al. |
| 2016/0103199 A1 | 4/2016 | Rappaport |
| 2016/0204929 A1 | 7/2016 | Shimizu et al. |
| 2016/0252607 A1 | 9/2016 | Saboo et al. |
| 2017/0086202 A1 | 3/2017 | Chen |
| 2017/0090011 A1 * | 3/2017 | West ........................ G01S 7/28 |
| 2017/0097413 A1 | 4/2017 | Gillian et al. |
| 2017/0201887 A1 | 7/2017 | Farshchian et al. |
| 2017/0307728 A1 | 10/2017 | Eshraghi et al. |
| 2017/0366242 A1 | 12/2017 | Lee et al. |
| 2018/0031673 A1 * | 2/2018 | Kim ........................ G01S 7/006 |
| 2018/0095161 A1 | 4/2018 | Kellum et al. |
| 2018/0329049 A1 | 11/2018 | Amihood et al. |
| 2018/0329050 A1 | 11/2018 | Amihood et al. |
| 2018/0348339 A1 | 12/2018 | Lien et al. |
| 2018/0348353 A1 | 12/2018 | Lien et al. |
| 2019/0120954 A1 | 4/2019 | Kim et al. |

FOREIGN PATENT DOCUMENTS

| | | |
|---|---|---|
| CN | 101354438 | 1/2009 |
| CN | 102087362 | 6/2011 |
| CN | 103416036 | 11/2013 |
| EP | 1548461 | 6/2005 |
| EP | 1775600 | 4/2007 |
| EP | 3073574 | 9/2016 |
| TW | I287367 | 7/2006 |
| WO | 9723063 | 6/1997 |
| WO | 2010099268 | 9/2010 |
| WO | 2014094928 | 6/2014 |
| WO | 2015184406 | 12/2015 |
| WO | 2017044038 | 3/2017 |
| WO | 2018208958 | 11/2018 |
| WO | 2018222266 | 12/2018 |
| WO | 2018222267 | 12/2018 |
| WO | 2018222268 | 12/2018 |

OTHER PUBLICATIONS

Lin, et al., "Study of Sub-6GHz Hybrid Beamforming Technology", ICT Journal No. 168, Dec. 29, 2016, 7 pages.
"Foreign Office Action", Taiwanese Application No. 107107978, dated Jan. 15, 2019, 9 pages.
"Foreign Office Action", Taiwanese Application No. 107115694, dated Dec. 21, 2018, 6 pages.
"Foreign Office Action", Taiwanese Application No. 107107729, dated Feb. 18, 2019, 7 pages.
Fan, et al., "Hand Gesture Recognition Based on Wi-Fi Chipsets", 2017 IEEE Radio and Wireless Symposium (RWS), Jan. 15, 2017 IEEE, pp. 98-100, 2017, 3 pages.
"EP Appeal Decision", European Application No. 10194359.5, dated May 28, 2019, 20 pages.
"Galaxy S4 Air Gesture", Galaxy S4 Guides, https://allaboutgalaxys4.com/galaxy-s4-features-explained/air-gesture/, 4 pages.
"International Preliminary Report on Patentability", PCT Application No. PCT/US2018/025489, dated Aug. 30, 2019, 18 pages.
"Samsung Galaxy S4 Air Gestures", Video from https://www.youtube.com/watch?v=375Hb87yGcg, May 7, 2013.
"International Search Report", Application No. PCT/US2018/025506, dated Jul. 18, 2018, 4 pages.
"International Search Report", PCT Application No. PCT/US2018/025489, dated Jul. 18, 2018, 4 pages.
"International Search Report and Written Opinion", PCT Application No. PCT/US2018/025495, dated Jun. 28, 2018, 14 pages.
"International Search Report and Written Opinion", PCT Application No. PCT/US2018/031862, dated Jul. 26, 2018, 13 pages.
"Written Opinion", PCT Application No. PCT/US2018/025489, dated Jul. 18, 2018, 8 pages.
"Written Opinion", PCT Application No. PCT/US2018/025506, dated Jul. 18, 2018, 8 pages.
Chen, et al., "Indoor Target Tracking Using High Doppler Resolution Passive Wi-Fi Radar", 2015 IEEE International Conference on Acoustics, Speech and Signal Processing (ICASSP), Apr. 1, 2015 (Apr. 1, 2015), pp. 5565-5569, XP055311663, DOI: 10.1109/ICASSP.2015.7179036 ISBN: 978-1-4673-6997-8, Apr. 1, 2015, 5 pages.
Tenglong, et al., "Hand Gesture Recognition Based on Wi-Fi Chipsets", 2017 IEEE Radio and Wireless Symposium , ( RWS). IEEE, Jan. 15, 2017 (Jan. 15, 2017), pp. 98-100, XP033080528, DOI: 10.1109/RWS.2017.7885956, Jan. 15, 2017, 3 pages.
"Foreign Office Action", Taiwanese Application No. 107107979, dated Apr. 12, 2019, 3 pages.
"International Preliminary Report on Patentability", PCT Application No. PCT/US2018/025506, dated May 15, 2019, 15 pages.
"Written Opinion of the International Preliminary Examining Authority", PCT Application No. PCT/US2018/025489, dated May 10, 2019, 7 pages.
"International Preliminary Report on Patentability", PCT Application No. PCT/US2018/031862, dated Nov. 21, 2019, 12 pages.
"International Preliminary Report on Patentability", PCT Application No. PCT/US2018/025495, dated Dec. 12, 2019, 8 pages.
"Non-Final Office Action", U.S. Appl. No. 15/928,386, dated Jan. 7, 2020, 14 Pages.
"Non-Final Office Action", U.S. Appl. No. 15/928,273, dated Feb. 18, 2020, 11 Pages.
"Non-Final Office Action", U.S. Appl. No. 15/974,502, dated Feb. 18, 2020, 11 Pages.
"Non-Final Office Action", U.S. Appl. No. 15/974,528, dated Feb. 18, 2020, 11 Pages.
"Extended European Search Report", EP Application No. 20170421.0, dated Jun. 9, 2020, 7 pages.
"Final Office Action", U.S. Appl. No. 15/974,502, dated Jun. 4, 2020, 13 Pages.
"Final Office Action", U.S. Appl. No. 15/974,528, dated Jun. 5, 2020, 12 Pages.
"Foreign Office Action", Chinese Application No. 201880007506.1, dated Apr. 2, 2020, 11 pages.
"Notice of Allowance", U.S. Appl. No. 15/928,386, dated Apr. 21, 2020, 7 Pages.
"Notice of Allowance", U.S. Appl. No. 15/928,273, dated Jul. 15, 2020, 7 Pages.
"Notice of Allowance", U.S. Appl. No. 15/974,502, dated Aug. 12, 2020, 7 Pages.

* cited by examiner

FULL-DUPLEX OPERATION FOR RADAR SENSING USING WIRELESS COMMUNICATION CHIPSET

CROSS-REFERENCE TO RELATED APPLICATION

This application claims the benefit of U.S. Provisional Application No. 62/512,952 filed 31 May 2017, the disclosure of which is hereby incorporated by reference in its entirety herein.

BACKGROUND

Radars are useful devices that can detect and track objects, map surfaces, and recognize targets. In many cases, a radar may replace bulky and expensive sensors, such as a camera, and provide improved performance in the presence of different environmental conditions, such as low lighting and fog, or with moving or overlapping targets.

While it may be advantageous to use radar sensing, there are many challenges associated with incorporating radar sensors in commercial devices. Smaller consumer devices, for example, place restrictions on a size of the radar sensor, which can limit performance. Furthermore, conventional radars use custom-designed radar-specific hardware to generate radar-specific signals. This hardware can be expensive and require additional space in consumer devices, if incorporated. As a result, consumer devices are unlikely to incorporate radar sensors due to the additional cost and space constraints.

SUMMARY

Techniques and apparatuses are described that enable full-duplex operation for radar sensing using a wireless communication chipset. A controller initializes or controls connections between multiple transceivers and antennas in the wireless communication chipset. For wireless communication chipsets that include at least one transceiver and at least two antennas, the controller can cause at least one transmit chain and at least one receive chain to be connected to different antennas. This enables the wireless communication chipset to be used as a continuous-wave radar and simultaneously transmit and receive radar signals. For wireless communication chipsets that include at least one transceiver and at least one antenna, the controller can enable rapid switching being connecting the transmit chain or the receive chain to the antenna. This enables the wireless communication chipset to be used as a pulse-Doppler radar and interleave pulses from transmitted and received radar signals. By utilizing these techniques, the wireless communication chipset can be used for wireless communication or radar sensing.

Aspects described below include a wireless communication chipset, a processor, and a computer-readable storage media comprising computer-executable instructions that, responsive to execution by the processor, implement a controller. The wireless communication chipset includes a transmitter, a receiver, at least two antennas, and at least two switches. The wireless communication chipset is configured to transmit, via the transmitter a signal. The wireless communication chipset is also configured to receive, via the receiver, the signal. The controller is configured to cause one switch of the at least two switches to connect the transmitter to one antenna of the at least two antennas to enable the transmitter to transmit the signal via the one antenna. The controller is also configured to cause another switch of the at least two switches to connect the receiver to another antenna of the at least two antennas to enable the receiver to receive the signal via the other antenna during at least a portion of time that the transmitter transmits the signal via the one antenna.

Aspects described below also include a wireless communication chipset, a processor, and a computer-readable storage media comprising computer-executable instructions that, responsive to execution by the processor, implement a controller. The wireless communication chipset includes a transmitter, a receiver, at least one antenna, and a switch. The wireless communication chipset is configured to connect, via the switch, the transmitter or the receiver to the at least one antenna. The wireless communication chipset is also configured to transmit, via the transmitter, a signal. The signal includes multiple pulses. Via the receiver, the wireless communication chipset is configured to receive the multiple pulses. The controller is configured to cause the switch to switch between connecting the transmitter or the receiver to enable one pulse of the multiple pulses to be received by the receiver between a time that the transmitter transmits two other pulses of the multiple pulses.

Aspects described below also include a method that causes a transmitter of a wireless communication chipset to be connected to a first antenna. The method also includes causing a receiver of the wireless communication chipset to be connected to a second antenna. Via the transmitter and the first method, the method includes transmitting a signal. The method also includes receiving the signal that is reflected by a target via the receiver and the second antenna. The receiving of the signal occurs during at least a portion of time that the transmitter is transmitting the signal. The method further includes processing the signal that is received to determine a location of the target.

Aspects described below also include a system with means for controlling a connection of one or more transmitters, receivers, and antennas in a wireless communication chipset.

BRIEF DESCRIPTION OF THE DRAWINGS

Apparatuses for and techniques enabling full-duplex operation for radar sensing using a wireless communication chipset are described with reference to the following drawings. The same numbers are used throughout the drawings to reference like features and components:

FIG. 6-1 illustrates full-duplex operation of a wireless communication chipset for continuous-wave radar.

FIG. 6-2 illustrates full-duplex operation of a wireless communication chipset for pulse-Doppler radar.

FIG. 8-1 illustrates an example wireless communication chipset for digital beamforming.

FIG. 8-2 illustrates another example wireless communication chipset for digital beamforming.

DETAILED DESCRIPTION

Overview

Figure 1:
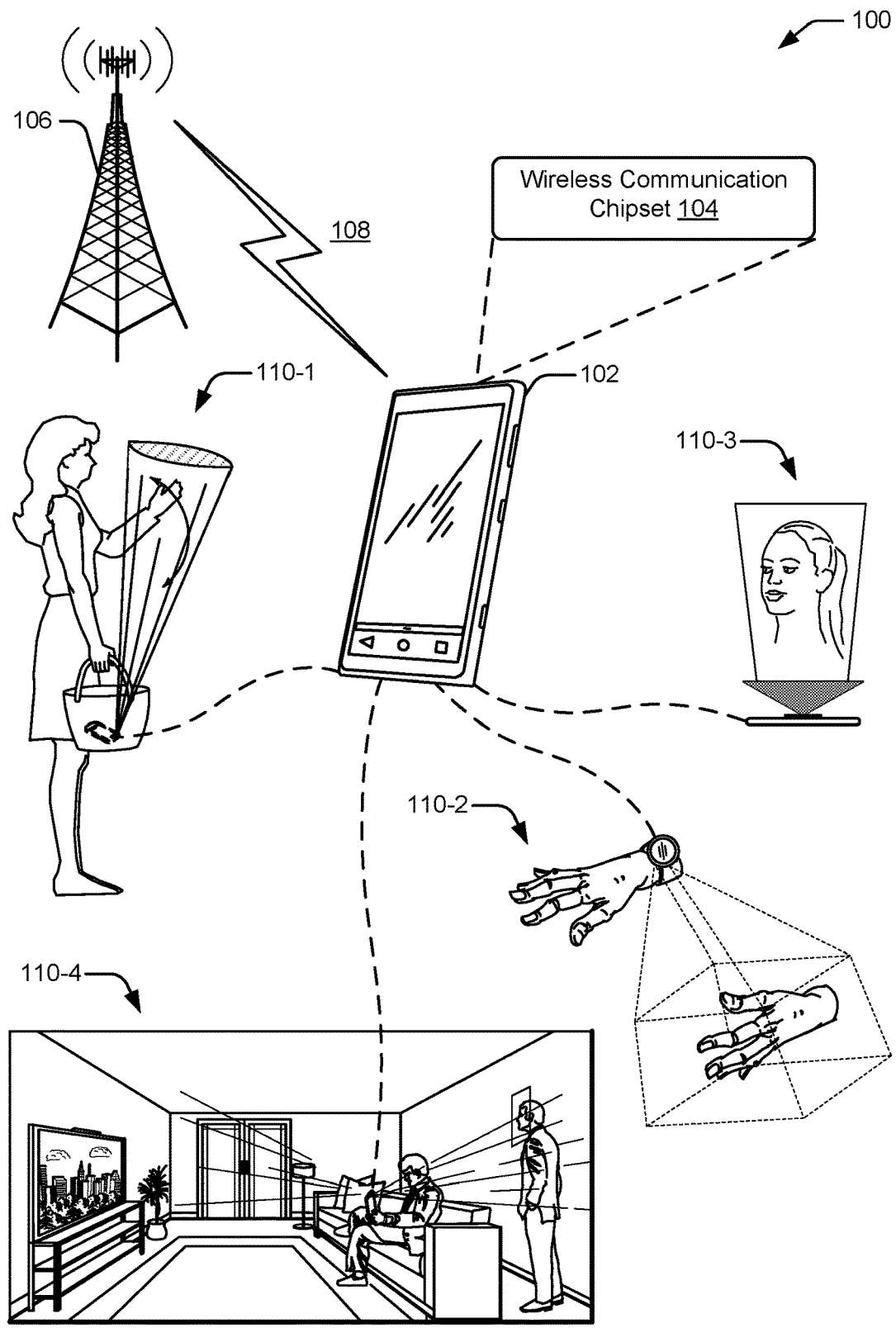
FIG. 1 illustrates an example environment in which radar sensing using a wireless communication chipset are described.

While many computing devices may not have radar sensors, these computing devices may benefit from radar sensing. Radar sensing can enhance, for example, user interfaces via gesture recognition, power-saving techniques via proximity detection, and so forth.

A computing device may, however, include a wireless communication chipset, which can enable a user to talk with friends, download information, share pictures, remotely control household devices, receive global positioning information, or listen to radio stations. Although used for transmitting and receiving wireless communication signals, the wireless communication chipset includes many similar components as a radar sensor, such as an antenna, a transceiver, and a processor. Furthermore, frequencies used for wireless communication may be similar to those used for radar sensing (e.g., S-band, C-band, X-band, millimeter-wave frequencies, and so forth).

The wireless communication chipset, however, is typically designed for wireless communication, not radar sensing. For example, the wireless communication chipset may be set-up to use time-division duplexing techniques to switch between transmitting and receiving communication signals, which may not facilitate detection of close-range targets for radar sensing. Additionally, the wireless communication chipset may be set-up to utilize a single transmit or receive chain, which may not facilitate determining angular positions of targets for radar sensing. Furthermore, the wireless communication chipset may set-up to utilize communication modulations, which may not facilitate determining ranges and Dopplers of targets for radar sensing.

As such, this document describes techniques and devices for using the wireless communication chipset to implement radar sensing techniques. The techniques utilize a controller that enables the wireless communication chipset to transmit and receive radar signals in addition to, or in lieu of, wireless communication signals. In particular, the controller can cause the wireless communication chipset to perform full-duplex operations, support digital beamforming, or produce radar modulations.

Full-duplex operation enables transmission and reception to occur over a same portion of time, thereby enabling the use of continuous-wave radar or pulse-Doppler radar techniques. Digital beamforming enables custom beamsteering and shaping for determining an angular position of the target. Using digital beamforming techniques, a variety of radar fields can be transmitted or received by the wireless communication chipset. Radar modulations enable a radar signal to be transmitted and received by the wireless communication chipset, thereby supporting frequency modulation (FM) ranging or doppler sensing techniques for radar sensing.

Using these techniques, the wireless communication chipset can be used for radar-based applications that detect a presence of a user, track the user's gestures for touch-free control, provide collision avoidance for autonomous driving, and so forth. Depending on a purpose of the computing device, the wireless communication chipset can be re-purposed for radar sensing or provide both wireless communication and radar sensing. Computing devices that include the wireless communication chipset can therefore utilize and benefit from radar sensing, without the use of a radar sensor or radar-specific hardware. Furthermore, some of the techniques can be can be tailored or optimized for a variety of different wireless communication chipsets having different configurations. Making radar sensing affordable and available to many computing devices can further enable multiple computing devices to implement active, passive, or bistatic radar techniques. This document now turns to example environments, after which example apparatuses, example methods, and an example computing system are described.

Example Environments

FIG. 1 is an illustration of an example environment 100 in which techniques using, and an apparatus including, radar sensing using a wireless communication chipset may be embodied. Environment 100 includes a computing device 102, which includes a wireless communication chipset 104 to communicate with a base station 106 through a wireless communication link 108 (wireless link 108). In this example, the computing device 102 is implemented as a smart phone. However, the computing device 102 may be implemented as any suitable computing or electronic device, as described in further detail with respect to FIGS. 2 and 3.

The base station 106 communicates with the computing device 102 via the wireless link 108, which may be implemented as any suitable type of wireless link. Although depicted as a tower of a cellular network, the base station 106 may represent or be implemented as another device, such as a satellite, cable television head-end, terrestrial television broadcast tower, access point, peer-to-peer device, mesh network node, Internet-of-Things (IoT) device, and so forth. Therefore, the computing device 102 may communicate with the base station 106 or another device via the wireless link 108.

The wireless link 108 can include a downlink of data or control information communicated from the base station 106 to the computing device 102 or an uplink of other data or control information communicated from the computing device 102 to the base station 106. The wireless link 108 may be implemented using any suitable communication protocol or standard, including those for cellular networks (e.g., 3rd Generation Partnership Project Long-Term Evolution (3GPP LTE) or 5th Generation (5G)), IEEE 802.11 (e.g., 802.11n/ac/ad/g/a/b), Wi-Fi, WiGig™, WiMAX™, Bluetooth™, multiple-input multiple-output (MIMO) networks, and so forth.

Instead of having a radar sensor, the computing device 102 utilizes the wireless communication chipset 104 for radar sensing. As shown in FIG. 1, example radar-sensing applications include an occluded-gesture recognition application 110-1, which enables the computing device 102 being carried in a purse to detect gestures made outside the purse. Another gesture recognition application 110-2 enables the computing device 102 (shown as a wearable smart watch) to provide a radar field (shown as a dashed-line cube) in which a user may make gestures within to interact with the computing device 102. An example medical diagnostic application 110-3 enables the computing device 102 to measure physiological characteristics or assess abnormal body movements, such as a facial twitch, of a user. These measurements can aid in diagnosing various medical conditions (e.g., a stroke or symptoms of Parkinson's disease). An example mapping application 110-4 enables the computing device 102 to generate a three-dimensional map of a surrounding environment for contextual awareness. Using the wireless communication chipset 104, the computing device 102 can implement active or passive radar sensing techniques, as described in further detail with respect to FIG. 2.

Figure 2:
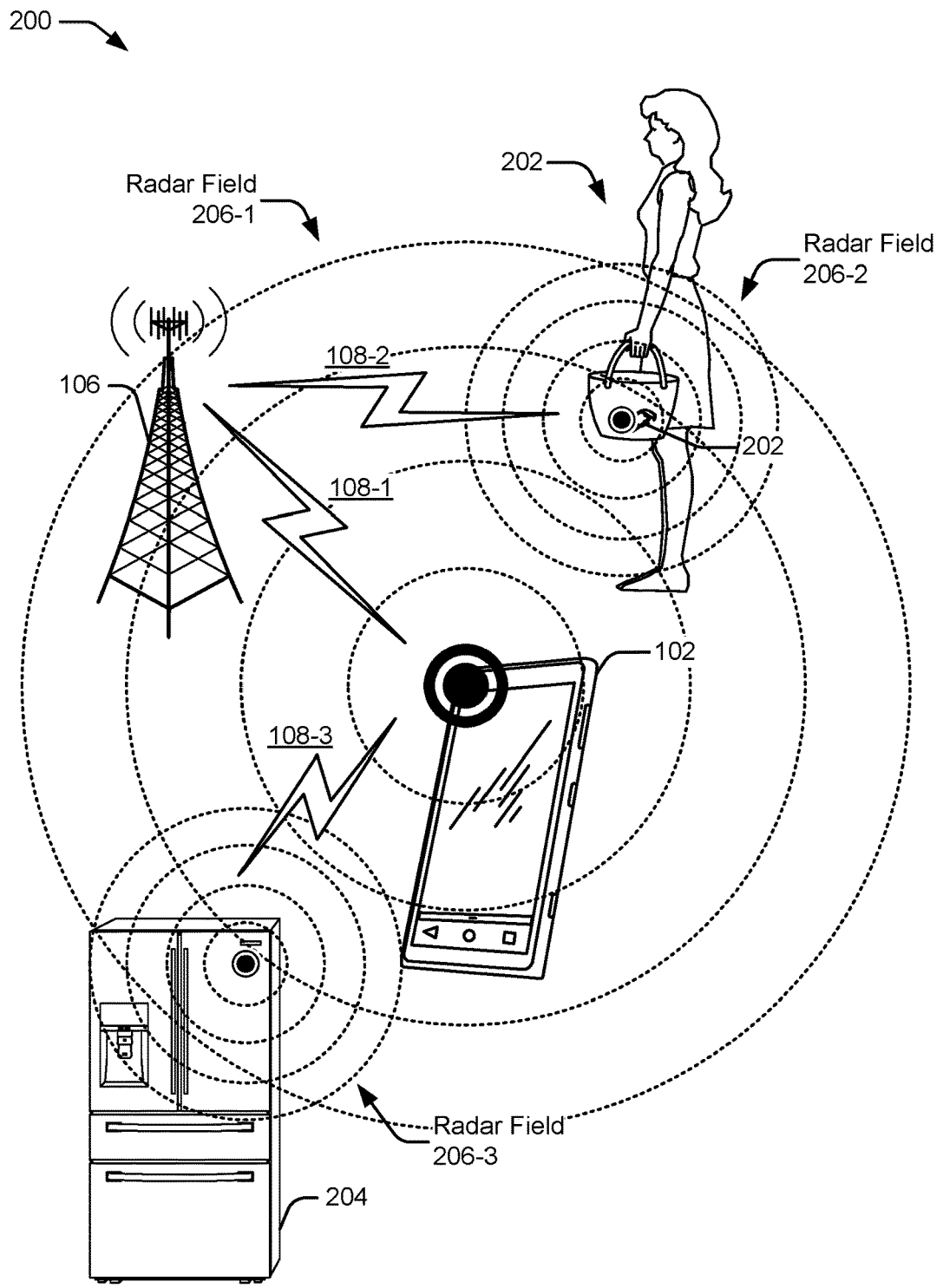
FIG. 2 illustrates an example environment with multiple communication devices performing wireless communications and radar sensing.

FIG. 2 illustrates an example environment 200 with multiple communication devices 102 performing wireless communications and radar sensing. The computing devices 102 in environment 200 include the computing device 102 of FIG. 1, a smart phone 202, and a smart refrigerator 204, each of which includes a wireless communication chipset 104. Using the wireless communication chipset 104, the computing device 102 and the smart phone 202 communicate with the base station 106 via wireless link 108-1 and wireless link 108-2, respectively. Likewise, the smart refrigerator 204 communicates with the computing device 102 via wireless link 108-3.

In addition to transmitting and receiving communication signals via the wireless links 108, each of these devices can also perform radar sensing. Using the wireless communication chipset 104, the computing device 102, the smart phone 202, and the smart refrigerator can operate as monostatic radars by transmitting and receiving their own radar signals, shown by radar fields 206-1, 206-2, and 206-3 respectively.

In environments in which more than one computing device 102 is present, such as in environment 200, multiple computing devices 102 can work together to implement a bistatic radar, a multistatic radar, or a network radar. In other words, one or more computing device 102 can transmit radar signals and one or more other computing device 102 can receive the radar signals. For cooperative radar sensing, the computing device 102 can be synchronized in time using atomic clocks, global-positioning system (GPS) time, cellular synchronization, wireless communications, and so forth.

In some cases, radar sensing operations can be assigned amongst the computing devices 102 according to each device's capability and location. For example, a device with a highest transmit power or a wider field-of-view, for example, can be used to transmit the radar signal. Radar data that is collected through cooperative or non-cooperative techniques can also be shared across all of the computing devices 102, which can improve probability of detection, target location accuracy, target tracking, and target orientation and shape estimation. The radar data provided by multiple computing device 102 can also be used to reduce false alarms, perform triangulations, or support interferometry.

The use of multiple computing devices 102 for radar sensing enables a large portion of a surrounding environment to be illuminated and for radar data to be collected from different perspectives. Time or power costs associated with radar sensing can also be distributed across the multiple computing devices 102, thereby enabling computing devices 102 with limited resources to perform radar sensing.

Figure 3:
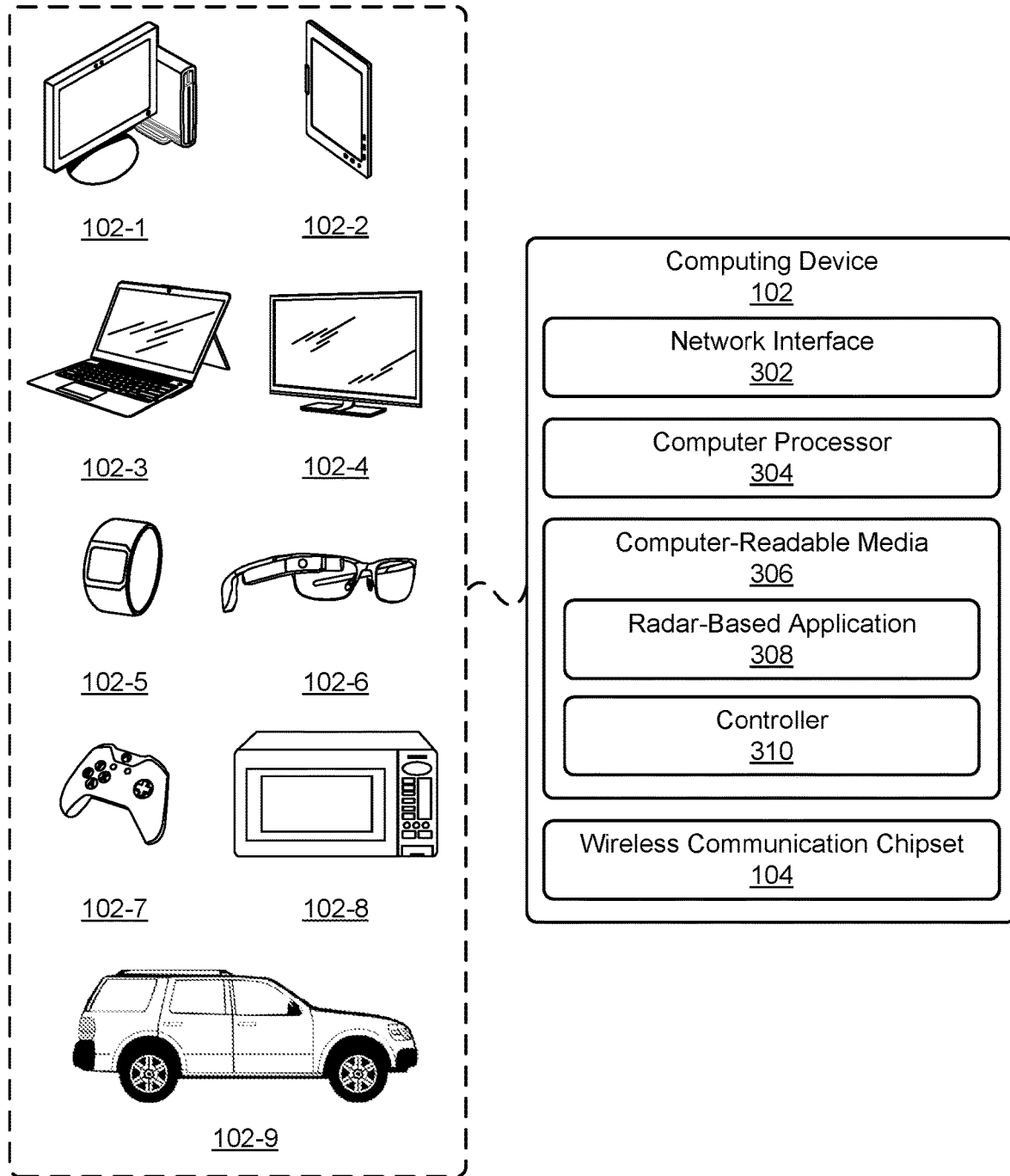
FIG. 3 illustrates an example computing device.

In more detail, consider FIG. 3, which illustrates the wireless communication chipset 104 as part of the computing device 102. The computing device 102 is illustrated with various non-limiting example devices including a desktop computer 102-1, a tablet 102-2, a laptop 102-3, a television 102-4, a computing watch 102-5, computing glasses 102-6, a gaming system 102-7, a microwave 102-8, and a vehicle 102-9. Other devices may also be used, such as wireless routers, drones, track pads, drawing pads, netbooks, e-readers, home-automation and control systems, and other home appliances. Note that computing device 102 can be wearable, non-wearable but mobile, or relatively immobile (e.g., desktops and appliances).

The computing device 102 may include a network interface 302 for communicating data over wired, wireless, or optical networks. For example, the network interface 302 may communicate data over a local-area-network (LAN), a wireless local-area-network (WLAN), a personal-area-network (PAN), a wire-area-network (WAN), an intranet, the Internet, a peer-to-peer network, point-to-point network, a mesh network, and the like. The computing device 102 may also include a display (not shown).

The computing device 102 also includes one or more computer processors 304 and computer-readable media 306, which includes memory media and storage media. The computer-readable media 306 is implemented to store instructions, data, and other information of the computing device 102, and thus does not include transitory propagating signals or carrier waves. Applications and/or an operating system (not shown) embodied as computer-readable instructions on the computer-readable media 306 can be executed by the computer processor 304 to provide some of the functionalities described herein. The computer-readable media 306 includes a radar-based application 308 and a controller 310. The radar-based application 308 uses radar data provided by the wireless communication chipset 104 to perform a radar sensing function, such as detecting a presence of a user, tracking the user's gestures for touch-free control, detecting obstacles for autonomous driving, and so forth.

The controller 310 controls operation of the wireless communication chipset 104 for wireless communication or radar sensing. In FIG. 3, the controller 310 is shown to be a software module that is stored on the computer-readable media 306 and executed by the computer processor 304. In some implementations, the controller 310 includes software or firmware that is transferred to or stored on the wireless communication chipset 104 and executed by the wireless communication chipset 104. In other cases, the controller 310 is a controller integrated within the wireless communication chip set 104.

The controller 310 initiates, sets, or operates the wireless communication chipset 104 to provide features for radar sensing. These features include full-duplex operation, digital beamforming, or radar modulations. The controller 310 can also manage time-sharing of the wireless communication chipset 104 for wireless communication or radar sensing based on priorities, the radar-based application 308, or a predetermined update rate for radar sensing. Requests for wireless communication or radar sensing can be obtained by the controller 310 from other applications associated with the computing device 102. In some cases, the controller 310 can cause the wireless communication chipset 104 to simultaneously provide both wireless communication and radar sensing, as described in further detail with respect to FIG. 10. The wireless communication chipset 104 is further described with respect to FIG. 4.

Figure 4:
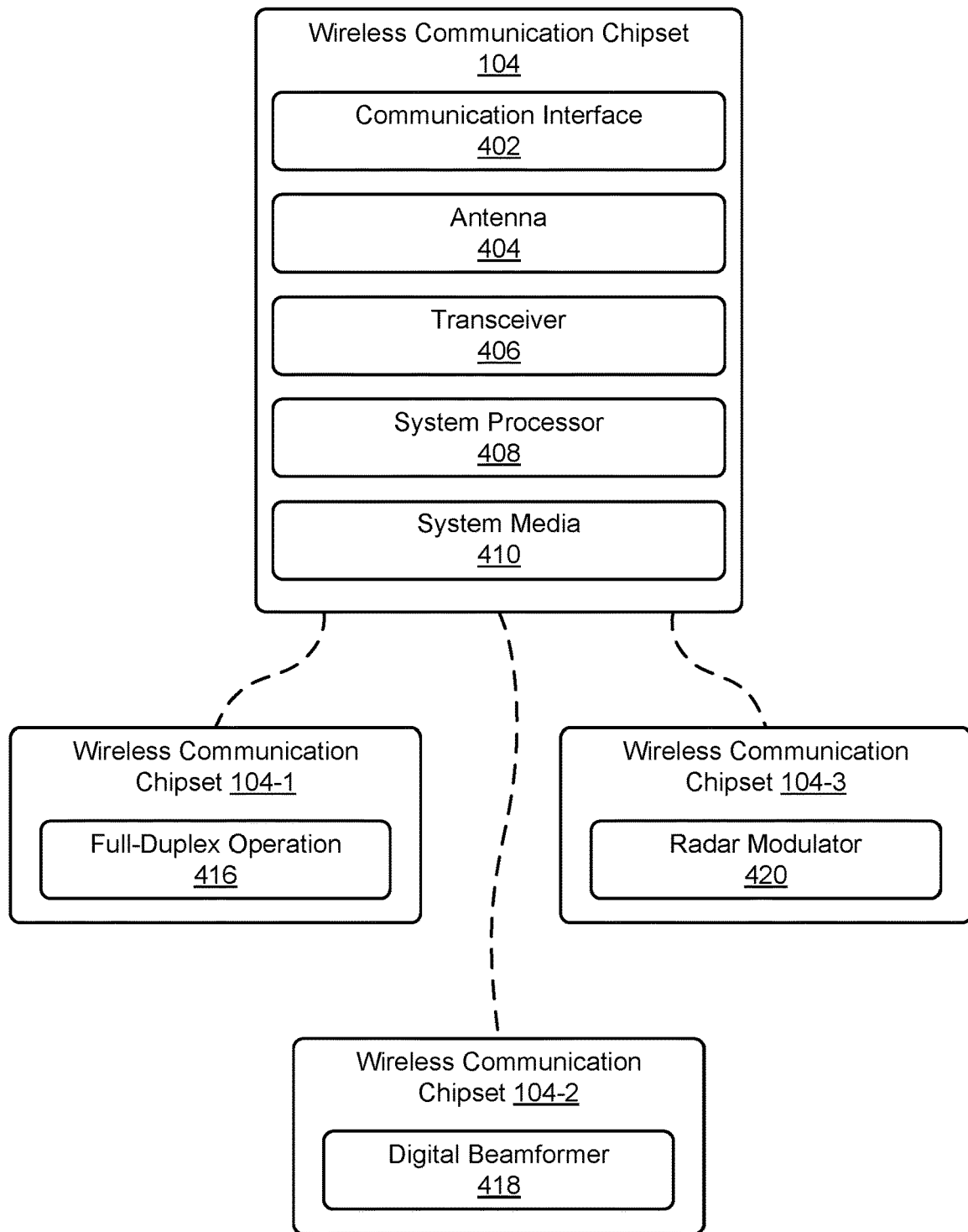
FIG. 4 illustrates an example wireless communication chipset.

FIG. 4 illustrates an example wireless communication chipset 104, which includes a communication interface 402. The communication interface 402 provides to the computing device 102 or a remote device communication data for wireless communication or radar data for radar sensing. The communication interface 402, however, need not be used when the wireless communication chipset 104 is integrated within the computing device 102. The radar data can include raw in-phase or quadrature (I/Q) data, pre-processed range-Doppler maps, and so forth, which can be further processed by the computer processor 304 via the radar-based application 308 or the controller 310.

The wireless communication chipset 104 also includes at least one antenna 404 and at least one transceiver 406. The antenna 404 can be separate from the wireless communication chipset 104 or integrated within the wireless communication chipset 104. The antenna 404 can include multiple antennas 404 for antenna diversity, transmit beamforming, or MIMO networks. In some cases, the multiple antennas 404 are organized in a two-dimensional shape (e.g., planar array). A spacing between the multiple antennas 404 may be less than, greater than, or equal to half a center wavelength of the radar signal. Using the antennas 404, the controller 310 can cause the wireless communication chipset 104 to form beams that are steered or un-steered, wide or narrow, or shaped (e.g., hemisphere, cube, fan, cone, cylinder). The steering and shaping can be realized using digital beamforming techniques, as described in further detail below.

The transceiver 406 includes circuitry and logic, such as filters, switches, amplifiers, mixers, and so forth, for conditioning signals that are transmitted or received via the antenna 404. The transceiver 406 can also include logic to perform in-phase and quadrature (I/Q) operations, such as synthesis, encoding, modulation, decoding, demodulation, and so forth. Based on types of wireless communications supported by the wireless communication chipset 104, the transceiver 406 can emit and receive microwave radiation in a 1 GHz to 400 GHz range, a 4 GHz to 100 GHz range, and narrower bands, such as 57 GHz to 63 GHz.

The wireless communication chipset 104 also includes one or more system processors 408 and system media 410, (e.g., one or more computer-readable storage media). The system processor 408 may also include baseband circuitry to perform high-rate sampling processes that can include analog-to-digital conversion, digital-to-analog conversion, fast-Fourier transforms (FFTs), gain correction, skew correction, frequency translation, and so forth. In general, the system processor 408 can provide communication data to the transceiver 406 for transmission. The system processor 408 can also process baseband signals from the transceiver 406 to generate data, which can be provided to the computing device 102 via the communication interface 402 for wireless communication or radar sensing. In some cases, portions of the controller 310 may be available in the system media 410 and executed by the system processor 408.

The controller 310 enables the wireless communication chipset 104 to provide additional features for radar sensing. In particular, the controller 310 can cause a first wireless communication chipset 104-1 to provide full-duplex operation 416, cause a second wireless communication chipset 104-2 to support digital beamforming via digital beamformer 418, or cause a third wireless communication chipset 104-3 to implement radar modulator 420.

Figure 5:
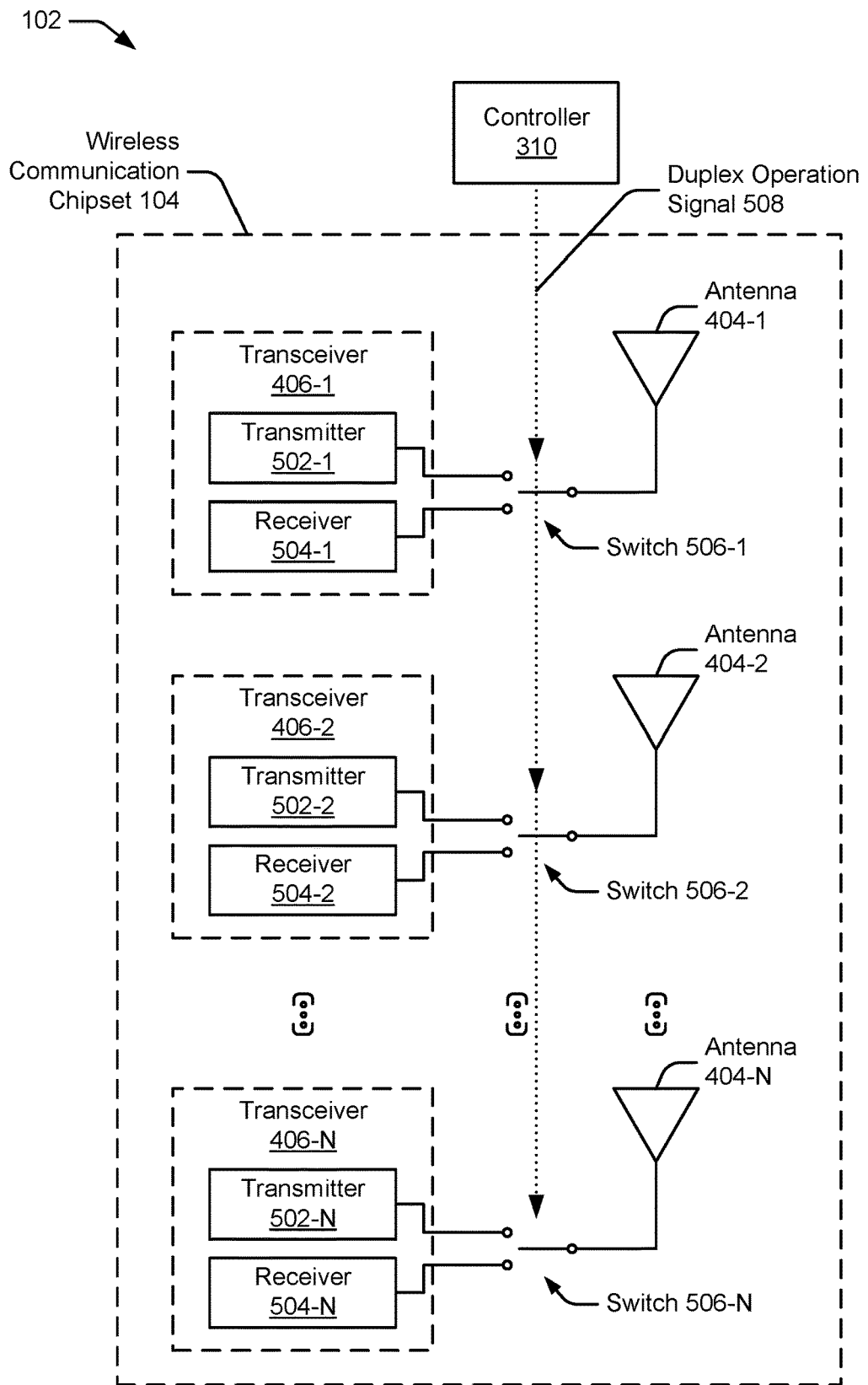
FIG. 5 illustrates an example communication device for full-duplex operation.
Figures 1, 6:
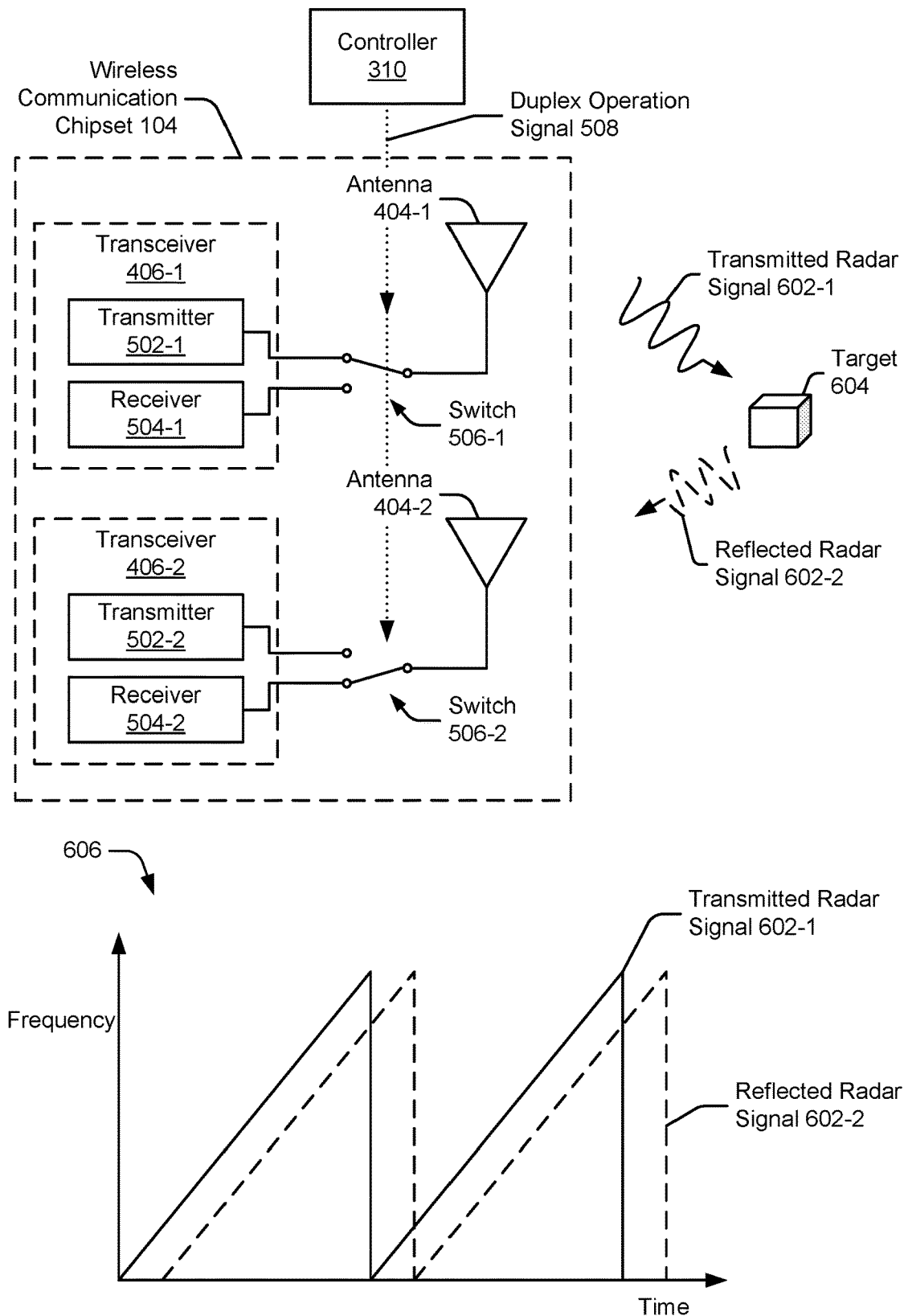
Figures 2, 6:
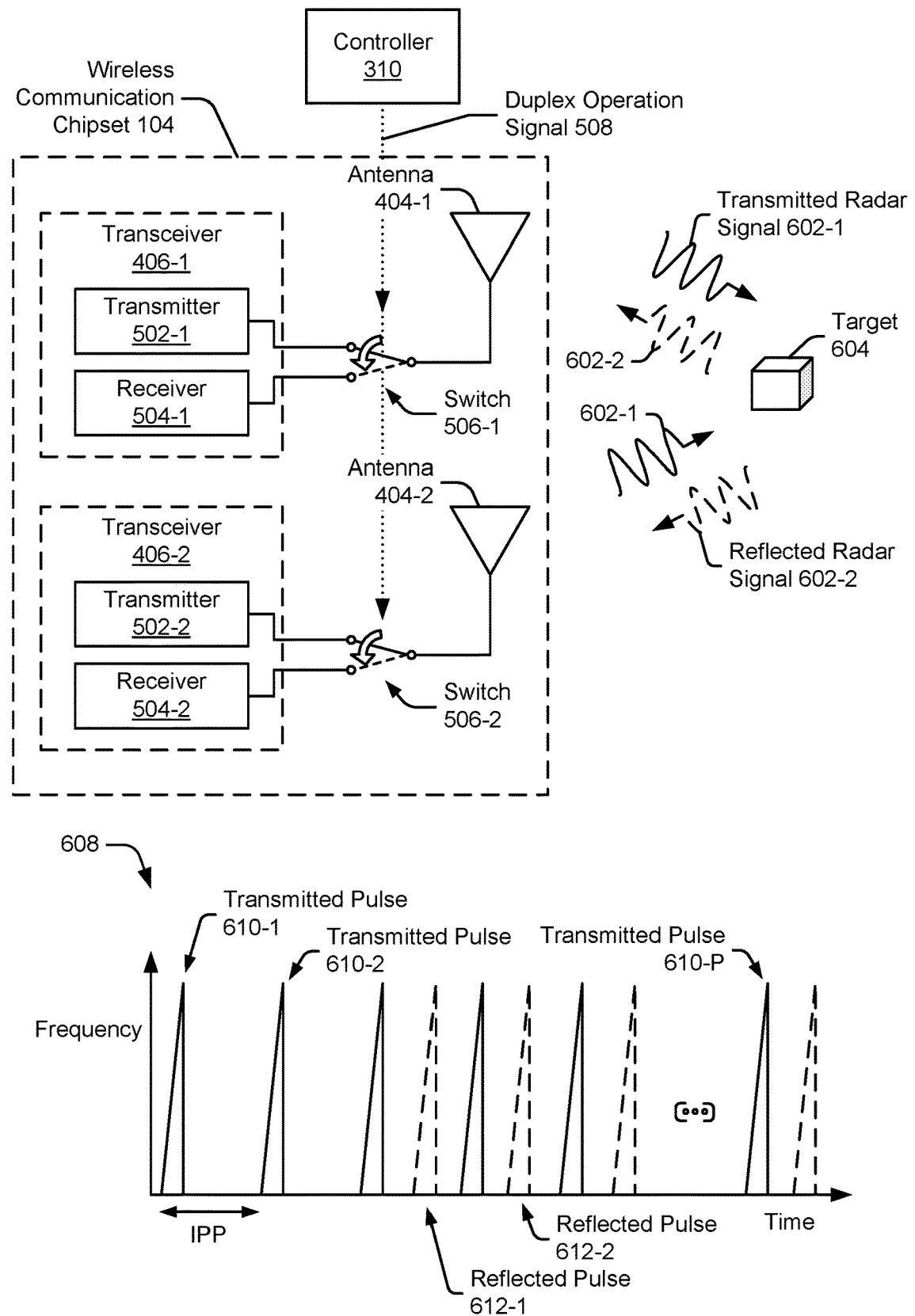

The full-duplex operation 416 can be realized by the controller 310 controlling connections between different transceivers 406 and different antennas 404 in the wireless communication chipset 104, as shown in FIG. 5. Some implementations of the full-duplex operation 416 enable the wireless communication chipset 104 to be used for continuous-wave radar, as shown in FIG. 6-1. Other implementations of the full-duplex operation 416 enable rapid interleaving of transmission and reception for pulse-Doppler radar, as shown in FIG. 6-2. The full-duplex operation 416 enables the wireless communication chipset 104 to be used for detecting close-range targets and for measuring range and range-rate of targets.

Digital beamforming can be realized by the controller 310 causing the wireless communication chipset 104 to provide baseband data from multiple receive chains (e.g., multiple transceivers 406 and multiple antennas 404) to the digital beamformer 418, as shown in FIGS. 7, 8-1, and 8-2. In some implementations, the digital beamformer 418 is implemented by the computing device 102 via the computer processor 304 and the computer-readable media 306. If the wireless communication chipset 104 includes circuitry and logic that performs a fast-Fourier transform (FFT), the digital beamformer 418 can alternatively be implemented by the system processor 408 and the system media 410. Furthermore, the digital beamformer 418 provides an alternative to additional hardware components, such as analog phase shifters, by performing phase shifting and amplitude tapering operations digitally.

Digital beamforming provides many advantages. For example, applying digital beamforming techniques for reception enables fewer antennas 404 to be used for transmitting the radar signal (e.g., reduces reliance upon transmission beamforming for radar sensing). Available timing resources are also efficiently utilized by enabling multiple beams to be formed digitally during reception instead of transmitting multiple narrow pencil beams over time. Additionally, the digital beamformer 418 enables a variety of patterns to be generated, which provides flexibility for supporting different arrangements of antennas 404 across different wireless communication chipsets 104.

Figure 9:
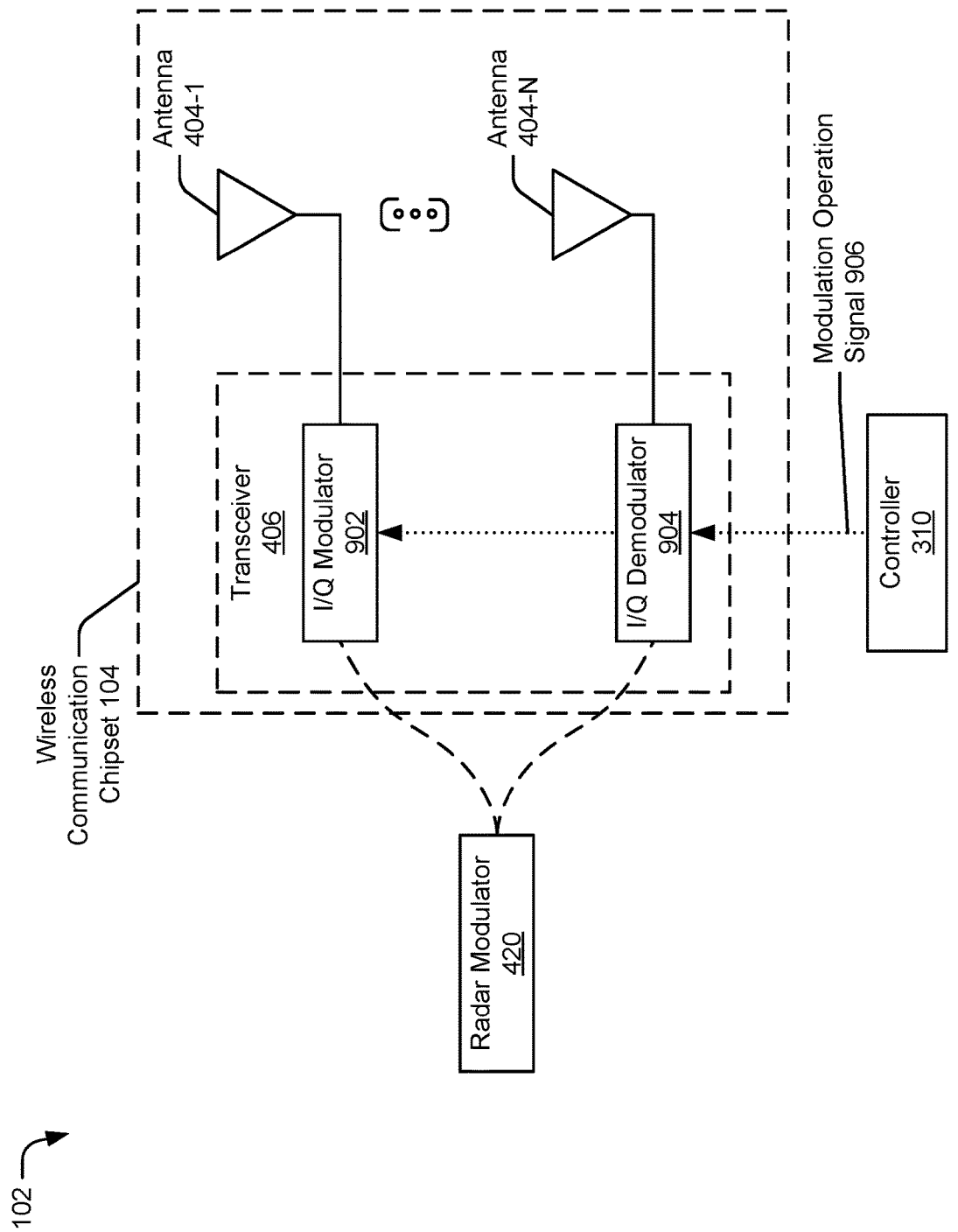
FIG. 9 illustrates an example radar modulator and wireless communication chipset for radar modulations.
Figure 10:
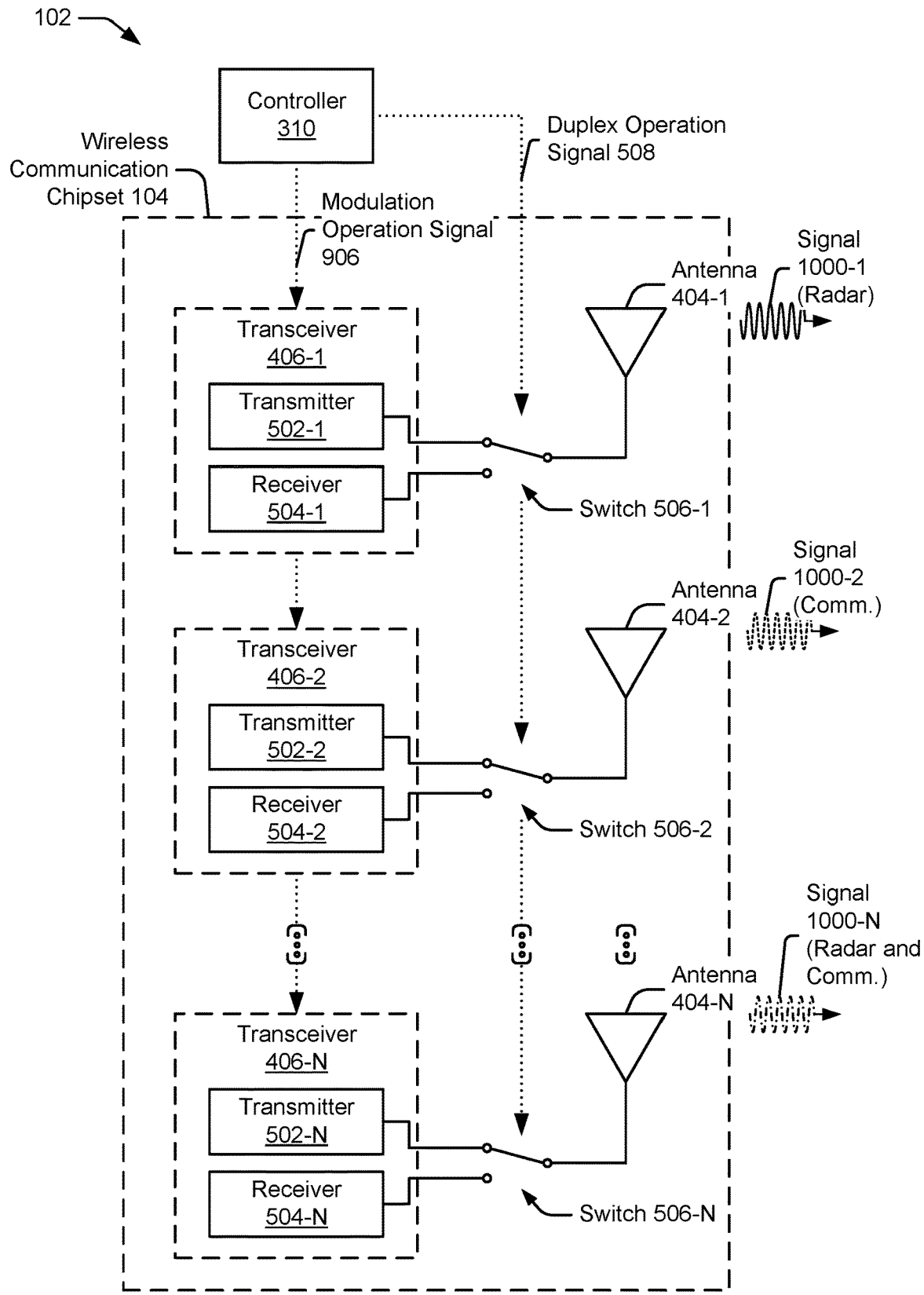
FIG. 10 illustrates an example communication device performing wireless communication and radar sensing.

Radar modulations can be realized by the controller 310 causing the wireless communication chipset 104 to operate an in-phase and quadrature (I/Q) modulator and demodulator as the radar modulator 420, as shown in FIG. 9. For example, the I/Q modulator can be programmed by the controller 310 to digitally generate radar-specific modulations that enable a range and doppler of a target to be determined. These radar modulations can also reduce interference with other radar signals or communication signals. In some cases, the radar modulator 420 can enable concurrent wireless communication and radar sensing, as shown in FIG. 10.

Although shown separately, different combinations of the full-duplex operation 416, the digital beamformer 418, and the radar modulator 420 can be implemented together for radar sensing using the wireless communication chipset 104. These features are further described with respect to FIGS. 5-10.

Full-Duplex Operation

FIG. 5 illustrates an example communication device 102 for full-duplex operation. The wireless communication chipset 104 includes multiple transceivers 406-1, 406-2 . . . 406-N, where "N" represents a positive integer. Each transceiver 406 includes a transmit and receive chain, represented by transmitters 502-1, 502-2 ... 502-N and receivers 504-1, 504-2 ... 504-N, respectively. The wireless communication chipset 104 also includes switches 506-1, 506-2 ... and 506-N and antennas 404-1, 404-2 ... 404-N. The switches 506 and the antennas 404 can be internal or external to the wireless communication chipset 104. In FIG. 5, the number of antennas 404, switches 506, and transceivers 406 are shown to be the same, however, different quantities are also possible. In some cases, the transceiver 406 may be coupled to more than one antenna 404 or the antenna 404 may be coupled to more than one transceiver 406.

In the depicted implementation, each switch 506 couples either a corresponding transmitter 502 or receiver 504 to a corresponding antenna 404. In some situations for wireless communication, the wireless communication chipset 104 may use time-division duplexing (TDD) to transmit or receive at different times. Thus, the switches 506 either coupled the transmitters 502 or the receivers 504 to the antennas 404 at any given time.

For radar sensing, however, it is advantageous to enable the wireless communication chipset 104 to provide full-duplex operation 416 of the transceivers 406, thereby enabling close-range radar sensing. The full-duplex operation 416 can be achieved by the controller 310 setting a state of the switches 506 via a duplex operation signal 508. In this way, the controller 310 can enable the wireless communication chipset 104 to perform continuous-wave radar or pulse-Doppler radar, as described in further detail with respect to FIGS. 6-1 and 6-2. Use of the switches 506 further enables the wireless communication chipset 104 to readily switch between full-duplex operation for radar sensing or half-duplex operation for wireless communication.

FIG. 6-1 illustrates full-duplex operation 416 of the wireless communication chipset 104 for continuous-wave radar operation. In the depicted implementation, the controller 310 causes a portion of the transmitters 502 and a portion of the receivers 504 to be simultaneously connected to respective antennas 404. For example, the duplex operation signal 508 causes the switch 506-1 to connect the transmitter 502-1 to the antenna 404-1 and causes the switch 506-2 to connect the receiver 504-2 to the antenna 404-2. In this way, the transmitter 502-1 transmits a radar signal 602 via the antenna 404-1 while the receiver 504-2 receives a portion of the radar signal 602 that is reflected by a target 604 via the antenna 404-2.

In some cases, the radar signal 602 can include a frequency-modulated signal, as shown in graph 606. The graph 606 plots a frequency of a transmitted radar signal 602-1 and a reflected radar signal 602-2 over time. The graph 606 illustrates full-duplex operation 416 whereby the transmitter 502-1 generates the transmitted radar signal 602-1 during a portion of time over which the receiver 504-2 receives the reflected radar signal 602-2. By measuring a shift in frequency between the transmitted radar signal 602-1 and the reflected radar signal 602-2 over time, a range and range-rate of the target 604 can be determined by the radar-based application 308.

Figures 1, 8:
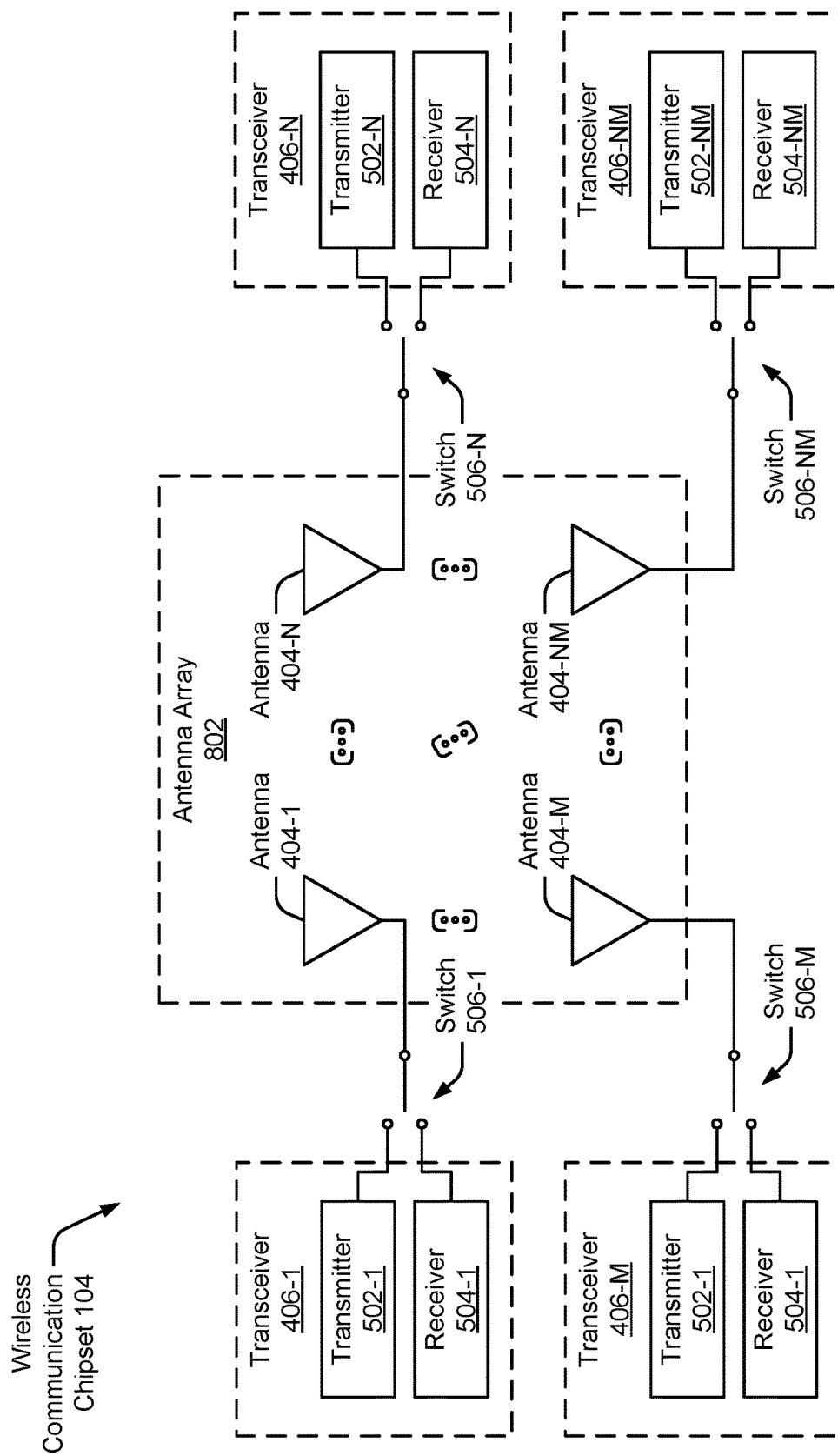
Figures 2, 8:
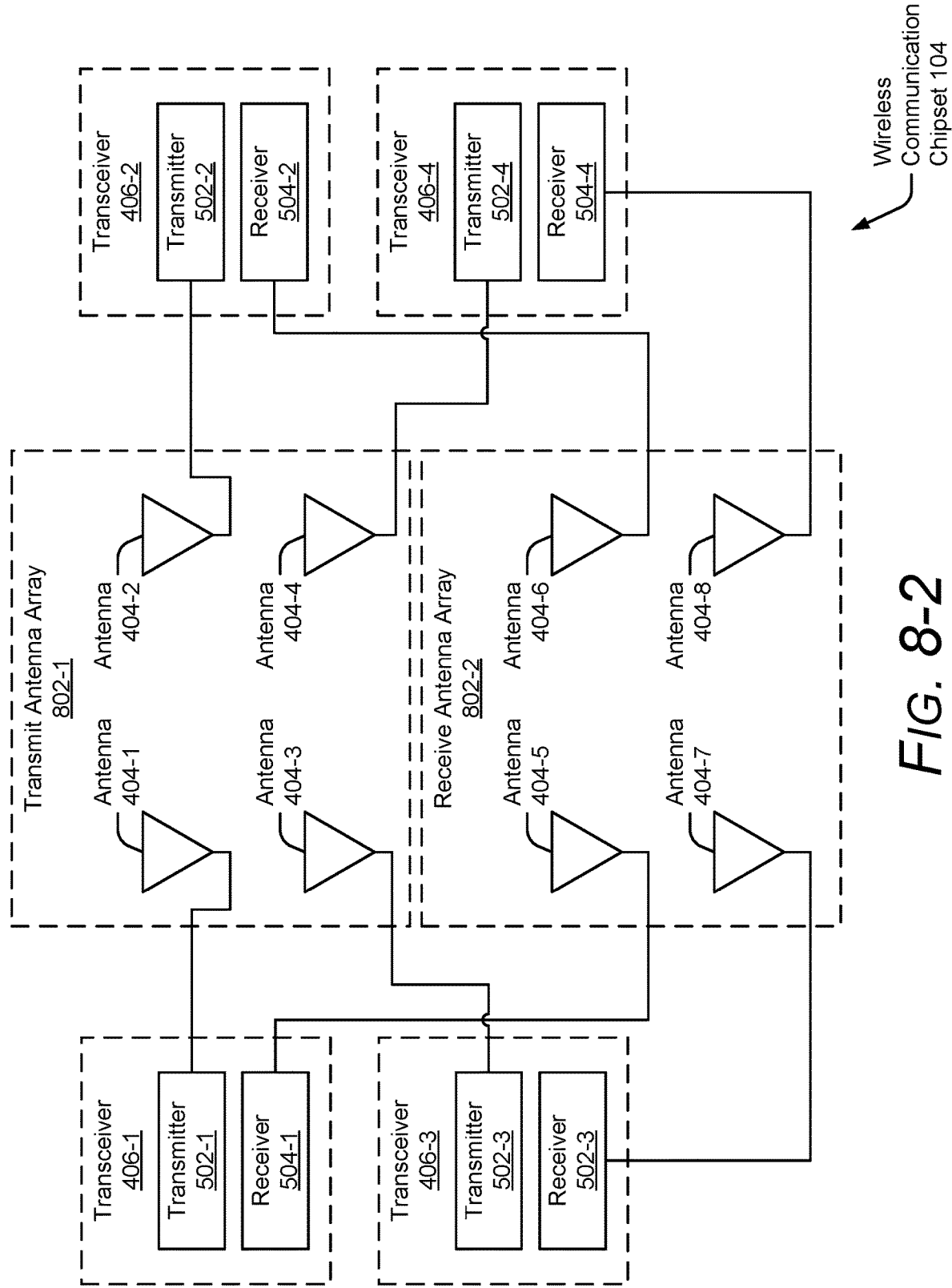

For transceivers 406 that share components for both the transmit and receive chain (e.g., a transceiver 406 that can perform transmission or reception at any given time), the full-duplex operation 416 for continuous-wave radar can be realized using at least two transceivers 406, whereby a transmit or a receive chain from each of the transceivers 406 is respectively connected to the antennas 404. Alternatively, for transceivers 406 that include separate transmit and receive chains (e.g., a transceiver 406 that can perform transmission and reception simultaneously) the full-duplex operation 416 for continuous-wave radar can be realized by respectively connecting the transmitter 502 and the receiver 504 of the transceiver 406 to the antennas 404 (as shown in FIG. 8-2).

FIG. 6-2 illustrates full-duplex operation 416 of the wireless communication chipset 104 for pulse-Doppler radar operation. In the depicted implementation, the controller 310 enables rapid switching between the transmitters 502 and the receivers 504. Using the duplex operation signal 508, the controller 310 can further coordinate switching across multiple switches 506. For pulse-Doppler radar, the controller 310 interleaves transmit and receive operations such that pulses of the transmitted radar signal 602-1 can be transmitted by transmitters 502-1 and 502-2 and pulses of the reflected radar signal 602-2 can be received by receivers 504-1 and 504-2. As an advantage, the pulse-Doppler radar operation enables a wireless communication chipset 104 having a single transceiver 406 or a single antenna 404 to perform radar sensing. In comparing to the continuous-wave radar techniques described in FIG. 6-1, sensitivity can also be increased using pulse-Doppler radar by enabling dual-use of the antennas 404 for both transmission and reception.

A graph 608 plots a frequency of the transmitted radar signal 602-1 and the reflected radar signal 602-2 over time. As shown, the transmitted radar signal 602-1 includes multiple transmitted pulses 610-1, 610-2 ... 610-P, where "P" represents a positive integer. A time between each transmitted pulse 610 is called an inter-pulse period (IPP). During each transmitted pulse 610, the controller 310 causes the transmitter 502 to be connected to the antenna 404. Between each transmitted pulse 610, the controller 310 causes the receiver 504 to be connected for receiving reflected pulses 612, such as reflected pulse 612-1 and 612-2. Although graph 608 illustrates that individual pulses are not transmitted and received at a same time, the rapid switching enables portions of the radar signal 602 to be transmitted or received across a same period of time, thus implementing a version of the full-duplex operation 416.

While two transceivers 406, two antennas 404, and two switches 506, are explicitly shown in FIGS. 6-1 and 6-2, the techniques for continuous-wave radar or pulse-Doppler radar can be applied to any number of transceivers 406, antennas 404, and switches 506. For wireless communication chipsets 104 that use circulators instead of switches 506, both continuous-wave and pulse-Doppler radar operations can also be performed.

Digital Beamforming

Figure 7:
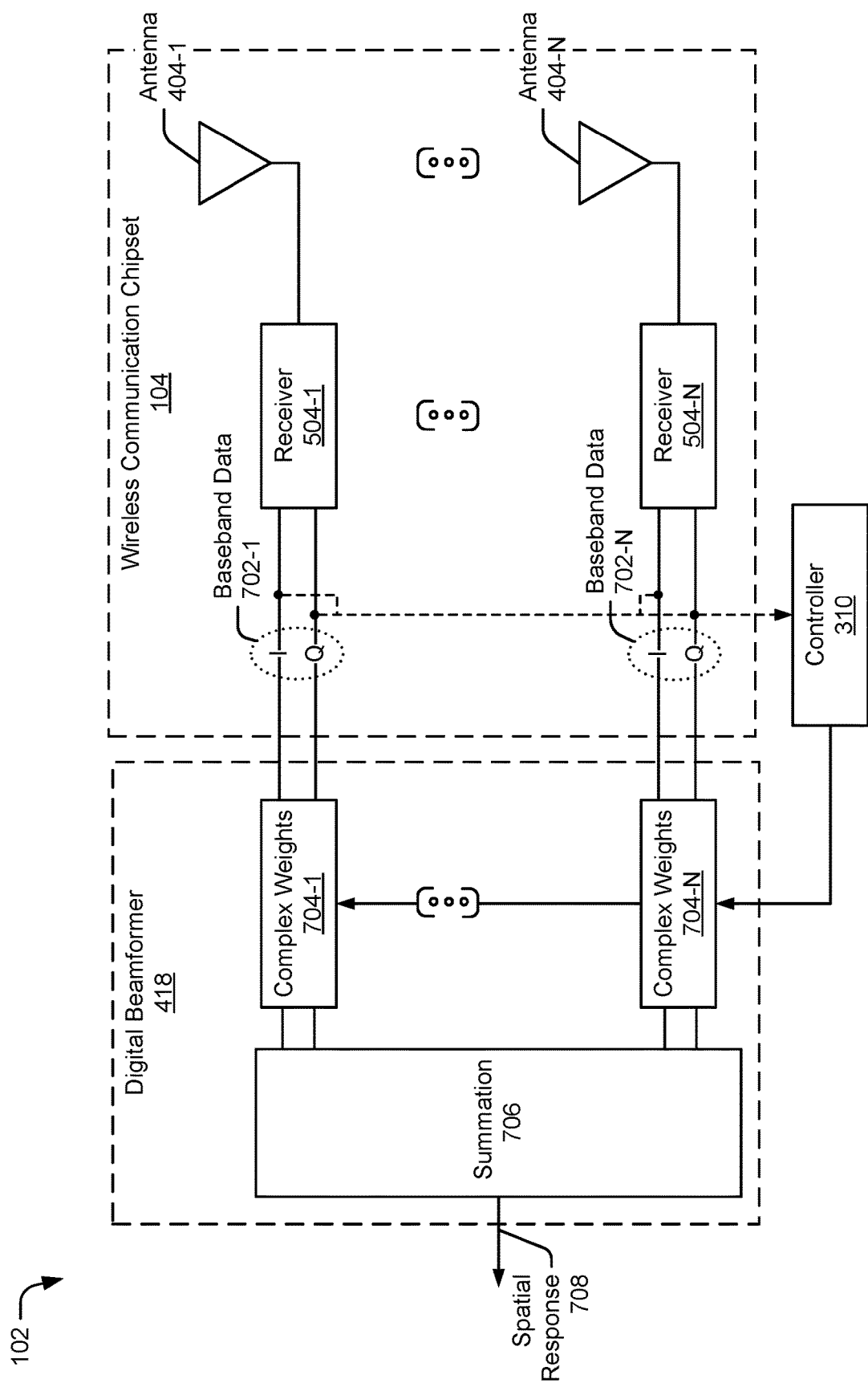
FIG. 7 illustrates an example digital beamformer and wireless communication chipset for digital beamforming.

FIG. 7 illustrates an example digital beamformer 418 and wireless communication chipset 104 for digital beamforming. Using digital beamforming techniques, a variety of radar fields can be transmitted or received, including wide fields, narrow fields, shaped fields (hemisphere, cube, fan, cone, cylinder), steered fields, un-steered fields, close range fields, far range fields, and so forth. While digital beamforming is discussed below with respect to receiving the radar signal 602, digital beamforming can also be implemented for transmitting the radar signal 602. In the depicted configuration, the receivers 504-1 to 504-N respectively process the reflected radar signal 602-2 received via the antennas 404-1 to 404-N to generate baseband data 702-1 to 702-N. In general, the responses from the antennas 404 are processed separately by individual receive chains. The baseband data 702 can include digital I/Q data collected across a period of time and for different wavenumbers associated with the radar signal 602.

The digital beamformer 418 obtains the baseband data 702 from the wireless communication chipset 104 (e.g., via the communication interface 402 if the digital beamformer 418 is implemented separate from the wireless communication chipset 104) and multiplies the baseband data 702 by complex weights 704-1 to 704-N. The digital beamformer 418 performs a summation 706 to combine the results from each of the receive chains to form a spatial response 708. The spatial response 708 can be provided to the radar-based application 308 for determining an angular position of the target 604. In general, the spatial response 708 includes amplitude and phase information for a set of angles, ranges, and times.

In some implementations, the controller 310 can set or provide the complex weights 704 to control shapes of antenna patterns used to generate the spatial response 708. The complex weights 704 can be based on pre-determined values and can enable thousands of beams to be formed simultaneously. The complex weights 704 can also be dynamically adjusted by the controller 310 in real-time to reduce interference from jammers or noise sources (e.g., by steering a null of the antenna patterns in a direction of the interference). The controller 310 can also configure the wireless communication chipset 104 to improve digital beamforming, as described in further detail with respect to FIGS. 8-1 and 8-2.

FIG. 8-1 illustrates an example configuration of the wireless communication chipset 104 for digital beamforming. The wireless communication chipset 104 includes an antenna array 802 having multiple antennas 404. In the depicted configuration, the antenna array 802 is a planar array having a two-dimensional arrangement of the antennas 404 (e.g., a triangular, rectangular, circular, or hexagonal arrangement), which enables a two-dimensional vector associated with an angle of arrival of the reflected radar signal 602-2 to be determined (e.g., enables determination of both an azimuth and elevation angle of the target 604). The antenna array 802 can include two of the antennas 404 positioned along one dimension of angular space (e.g., an azimuth or horizontal dimension) and another antenna 404 positioned along another dimension of the antenna space with respect to one of the two antennas 404 (e.g., an elevation or vertical dimension). Other implementations of the antenna array 802 can include a linear array (e.g., one-dimensional arrangement) such that either the azimuth or the elevation of the target 604 can be determined. In general, a two-dimensional antenna array enables beam steering in two planes (e.g., azimuth and elevation) and higher directivity compared to a one-dimensional antenna array with a same number of antennas and antenna spacing.

In the depicted configuration, the antenna array 802 is shown to have an N×M rectangular arrangement, where N and M are positive integers greater than one and which may or may not be equal to each other. Example arrangements include a 2×2 array, a 2×3 array, a 4×4 array, and so forth. For digital beamforming, the controller 310 can implement the techniques for full-duplex operation 416 to enable a portion of the transceivers 406-1 to 406-NM to receive the reflected radar signal 602-2 for digital beamforming using a portion of the antennas 404-1 to 404-NM in the antenna array 802.

In some implementations, the controller 310 can select which of the antennas 404 are used for digital beamforming. This can be achieved by controlling which of the antennas 404 in the antenna array 802 are connected to the receivers 504 (e.g., via the techniques described above for full-duplex operation 416). This enables the controller 310 to facilitate radar sensing via the wireless communication chipset 104 by selecting antennas 404 that realize a predetermined spacing that reduces effects of mutual coupling, enhances directivity, and so forth. To control angular ambiguities, the controller 310 can also choose the antennas 404 to realize an effective antenna spacing based on a center wavelength of the radar signal 602. Example antenna spacings can include approximately a center wavelength of the radar signal 602, half of the center wavelength, or a third of the center wavelength. Furthermore, the controller 310 can reduce a complexity of the digital beamforming by selecting antennas 404 that are equally spaced within the antenna array 802. In some implementations, the antennas 404 can be chosen such that a two-dimensional array is formed for transmission and reception, as shown in FIG. 8-2.

FIG. 8-2 illustrates another example wireless communication chipset 104 for digital beamforming. The wireless communication chipset 104 includes eight antennas 404-1 to 404-8 and four transceivers 406-1 to 406-4. The antennas 404-1 to 404-4 form a transmit antenna array 802-1 and the antennas 404-5 to 404-8 form a receive antenna array 802-2. In the depicted configuration, the transmitters 502-1 to 502-4 are respectively coupled to the antennas 404-1 to 404-4 in the transmit antenna array 802-1 and the receivers 504-1 to 504-4 are respectively coupled to the antennas 404-5 to 404-8 in the receive antenna array 802-2. In this way, digital beamforming can be realized for both transmission and reception of the radar signal 602. In other implementations, the transmit antenna array 802-1 may have a same or different antenna arrangement, number of antennas 404, or antenna spacing as the receive antenna array 802-2.

Radar Modulations

FIG. 9 illustrates an example radar modulator 420 and wireless communication chipset 104 for radar modulations. In the depicted configuration, the transceiver 406 of the wireless communication chipset 104 includes an I/Q modulator 902 and an I/Q demodulator 904. For wireless communication, the I/Q modulator 902 and the I/Q demodulator 904 may be respectively used for modulating communication data onto a carrier signal or demodulating the carrier signal to extract the communication data. Example modulations include amplitude, frequency, or phase modulations. As another example, orthogonal-frequency division-multiplexing (OFDM) may be performed by the I/Q modulator 902 and I/Q demodulator 904.

For radar sensing, the controller 310 can generate a modulation operation signal 906 to cause the I/Q modulator 902 and the I/Q demodulator 904 to operate as the radar modulator 420 and utilize a predetermined radar modulation type. Example radar modulations include frequency modulations (e.g., linear-frequency modulations (LFM), sawtooth frequency modulations, or triangular frequency modulations), stepped frequency modulations, phase-shift keying (PSK), pseudo-noise modulations, spread-spectrum modulations, and so forth. As an example, the controller 310 can cause the I/Q modulator 902 to produce a chirp signal and cause the I/Q demodulator 904 to demodulate the chirp signal for frequency-modulated continuous-wave (FMCW) radar.

The controller 310 can also use the modulation operation signal 906 to further specify a wireless communication channel for transmitting and receiving the radar signal 602, which effects a frequency and a bandwidth of the radar signal 602. In some aspects, different wireless communication frequency channels can be bonded to increase a bandwidth of the radar signal. Utilizing a larger bandwidth enhances range resolution for radar sensing via the wireless communication chipset 104 (e.g., increases range accuracy and enables multiple targets to be resolved in range). The I/Q modulator 902 and I/Q demodulator 904 can also be used to support performing multiple radar sensing operations simultaneously or performing both wireless communication and radar sensing simultaneously, as described in further detail with respect to FIG. 10.

FIG. 10 illustrates the computing device 102 performing wireless communication and radar sensing using the controller 310 and the wireless communication chip set 104. In this example, the wireless communication chipset 104 supports MIMO and OFDM. Based on the modulation operation signal 906, the wireless communication chip set 104 generates signals 1000-1, 1000-2 . . . 1000-N via separate transmit chains represented by transmitters 502-1, 502-2 . . . 502-N. The signals 1000-1, 1000-2, and 1000-N are respectively modulated for radar sensing, wireless communication, and both radar sensing and wireless communication. The signal 1000-N can be achieved by modulating a signal containing communication data using the radar modulation. In this way, other computing devices 102 that receive the signal 1000-N can process the signal 1000-N for wireless communication or for radar sensing (e.g., using techniques of bistatic, multistatic, or network radar as described in FIG. 3).

To avoid interference between the multiple signals 1000, the controller 310 can cause the I/Q modulator 902 to make the signals 1000 orthogonal to each another. In other aspects, the signals 1000-1, 1000-2, and 1000-3 can be transmitted using disjoint wireless communication channels. Different wireless communication channels can also be used for different radar modulations, enabling different radar signals 602 to be transmitted simultaneously. If timing, antenna, or transceiver resources are limited in the wireless communication chipset 104, the controller 310 can schedule the wireless communication and radar sensing to occur at different times based on priority, a predetermined update rate, or a request from another application.

Example Methods

Figure 11:
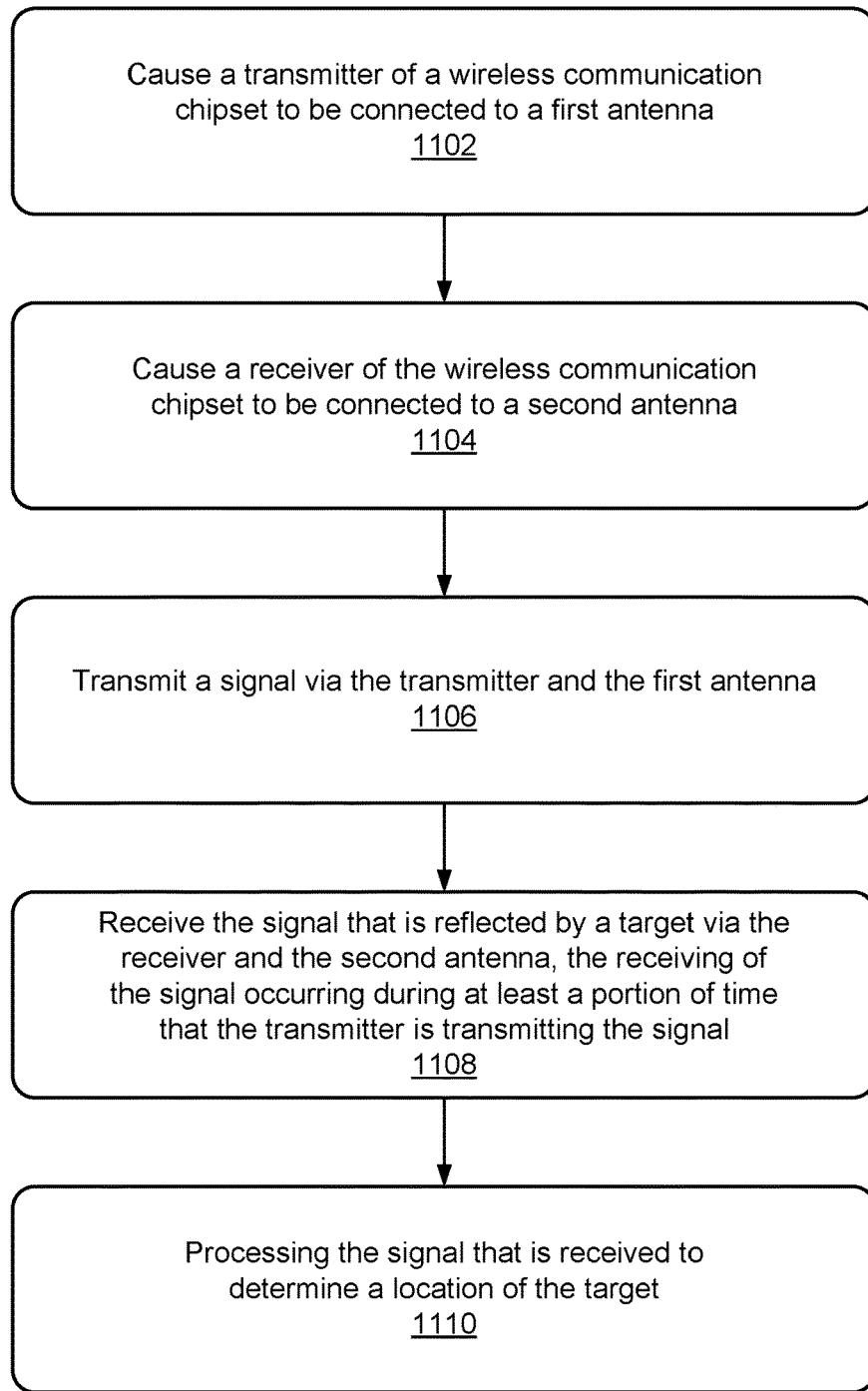
FIG. 11 illustrates an example method for performing full-duplex operation for radar sensing using the wireless communication chipset.
Figure 12:
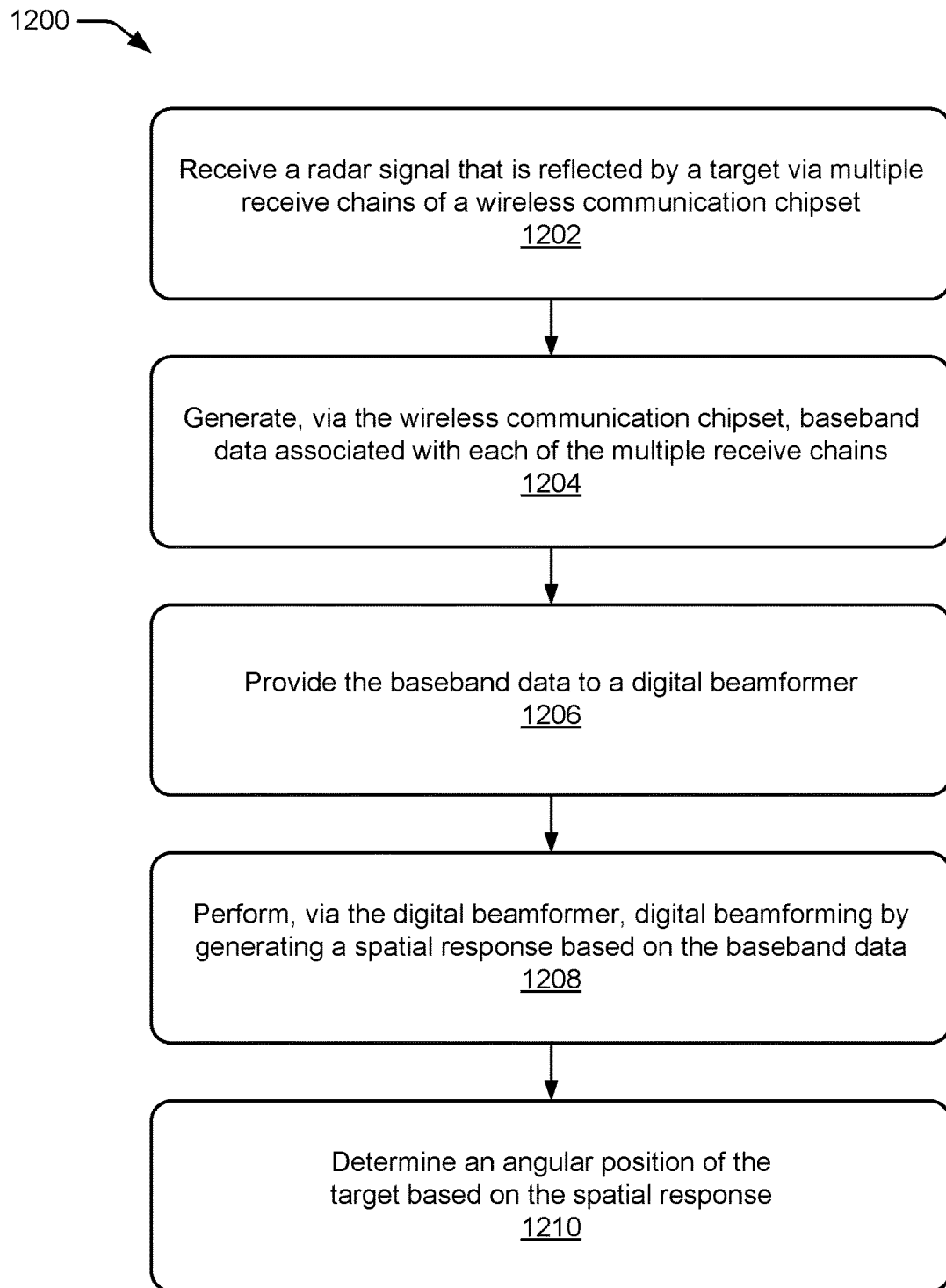
FIG. 12 illustrates an example method for performing digital beamforming for radar sensing using the wireless communication chipset.
Figure 13:
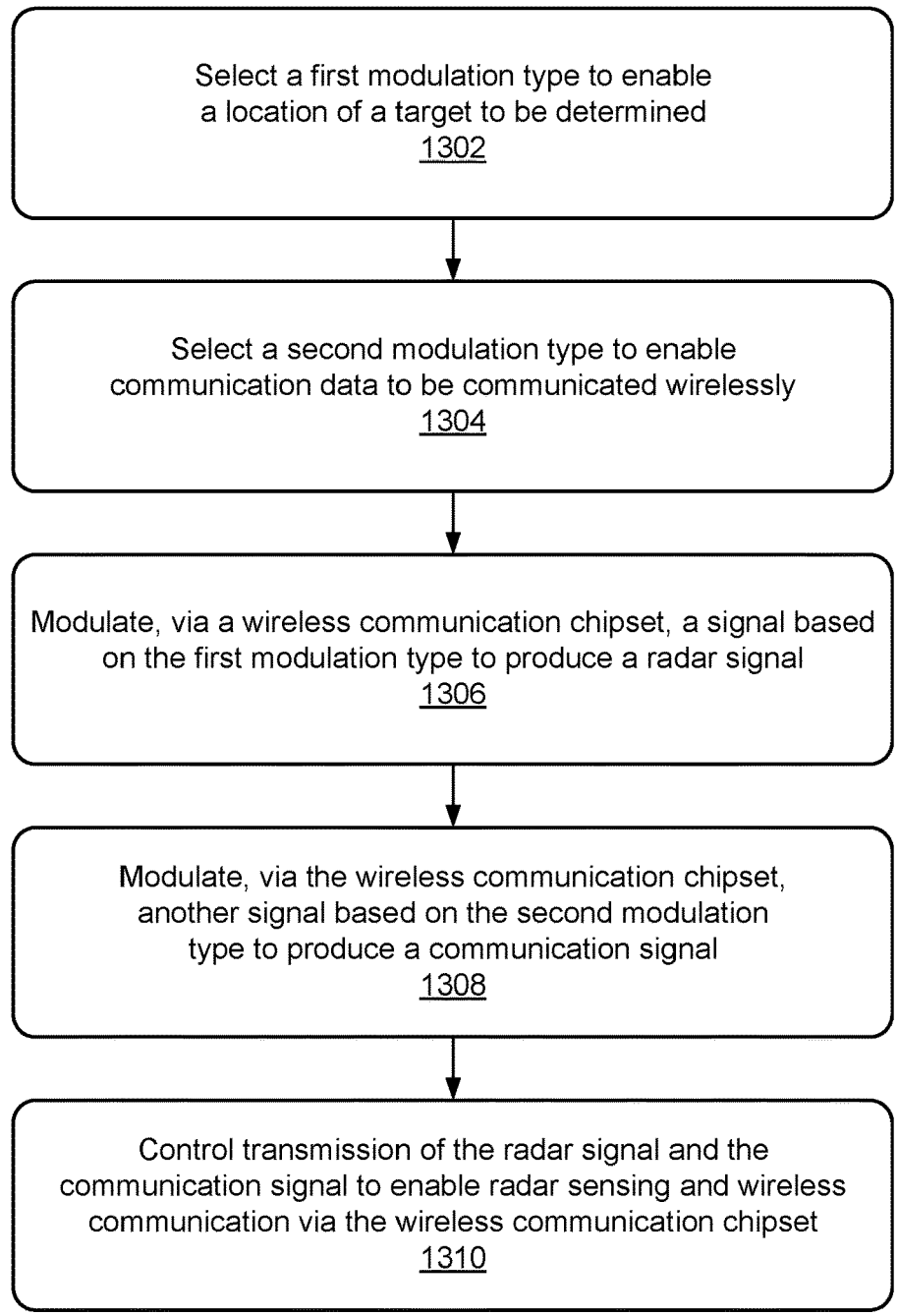
FIG. 13 illustrates an example method for performing radar modulations for radar sensing using the wireless communication chipset.

FIGS. 11-13 depicts example methods 1100, 1200, and 1300 for radar sensing using the wireless communication chipset 104. Methods 1100, 1200, and 1300 are shown as sets of operations (or acts) performed but not necessarily limited to the order or combinations in which the operations are shown herein. Further, any of one or more of the operations may be repeated, combined, reorganized, or linked to provide a wide array of additional and/or alternate methods. In portions of the following discussion, reference may be made to environments 100 and 200 of FIGS. 1 and 2 and entities detailed in FIGS. 3-10, reference to which is made for example only. The techniques are not limited to performance by one entity or multiple entities operating on one device.

FIG. 11 illustrates an example method for performing full-duplex operation for radar sensing using a wireless communication chip set. At 1102, a transmitter of a wireless communication chipset is caused to be connected to a first antenna. For example, the controller 310 can cause the wireless communication chip set 104 to connect the transmitter 502 to at least one of the antennas 404 in an antenna array 802.

At 1104, a receiver of the wireless communication chipset is caused to be connected to a second antenna. For example, the controller 310 can cause the wireless communication chipset 104 to connect the receiver 504 to at least one other antenna 404 in the antenna array 802. The transmitter 502 and the receiver 504 may be associated with a same transceiver 406 or different transceivers 406 in the wireless communication chip set 104.

At 1106, a signal is transmitted via the transmitter and the first antenna. For example, the transmitter 502-1 and the antenna 404-1 can transmit the radar signal 602. In some cases, the radar signal 602 may be a continuous-wave radar signal as shown in FIG. 6-1 or a pulsed radar signal as shown in FIG. 6-2.

At 1108, the signal that is reflected by a target is received via the receiver and the second antenna. The receiving of the signal occurs during at least a portion of time that the transmitter is transmitting the signal. For example, the radar signal 602 can be reflected by the target 604 and received via the receiver 504-2 and the second antenna 404-2. In some implementations, the receiver 504-1 can be used with the first antenna 404-1. For continuous-wave radar, portions of the radar signal 602 may be simultaneously transmitted while other portions of the signal are received. For pulse-Doppler radar, different pulses of the radar signal 602 may be received between other pulses that are transmitted.

At 1110, the signal that is received is processed to determine a location of the target. For example, the system processor 408 or the computer processor 304 can process the radar signal 602 to determine a range or an angular position of the target 604.

FIG. 12 illustrates an example method for performing digital beamforming for radar sensing using a wireless communication chipset. At 1202, a radar signal that is reflected by a target is received via multiple receive chains of a wireless communication chipset. For example, the reflected radar signal 602-2 can be received via at least a portion of the receivers 504-1 to 504-N and at least a portion of the antennas 404-1 to 404-N of the wireless communication chipset 104, as shown in FIG. 7. In general, each receive chain is associated with a transceiver 406 and one or more antennas 404. In some cases, the controller 310 can initialize or set-up the wireless communication chipset 104 for receiving the reflected radar signal 602-2 through the duplex operation signal 508. The controller 310 can also further select which receive chains are used to receive the reflected radar signal 602-2, which can further optimize the wireless communication chipset 104 for digital beamforming.

At 1204, baseband data associated with each of the multiple receive chains is generated via the wireless communication chipset. For example, the baseband data 702-1 to 702-N is generated by the wireless communication chipset 104. The baseband data 702-1 to 702-N can include digital I/Q data that is produced by the receivers 504-1 to 504-N.

At 1206, the baseband data is provided to a digital beamformer. For example, the digital beamformer 418 can be implemented within the wireless communication chipset 104 or the computing device 102. In some implementations, the baseband data 702 can be communicated to the digital beamformer 418 via the communication interface 402.

At 1208, digital beamforming is performed via the digital beamformer by generating a spatial response based on the baseband data. The digital beamformer 418, for example, can scale the baseband data 702 according to the complex weights and combine the data from each of the receive chains to produce the spatial response 708. In general, the spatial response 708 represents amplitude and phase information for different angles.

At 1210, an angular position of the target is determined based on the spatial response. The angular position can be determined via the radar-based application 308 based on the spatial response 708. In some cases, the angular position may include both an azimuth and an elevation of the target 604.

FIG. 13 illustrates an example method for performing radar modulations for radar sensing using a wireless communication chipset. At 1302, a first modulation type is selected to enable a location of a target to be determined. For example, the first modulation type can include a radar modulation, such as a linear-frequency modulation, a stepped-frequency modulation, phase shift-keying, and so forth.

At 1304, a second modulation type is selected to enable communication data to be communicated wirelessly. The communication modulation type may include orthogonal frequency-division multiplexing.

At 1306, a signal is modulated via a wireless communication chipset based on the first modulation type to produce a radar signal. For example, the wireless communication chipset 104 can include the I/Q modulator 902. The controller 310 can cause, via the modulation operation signal 906, the I/Q modulator 902 to use the radar modulation to produce the radar signal 602, the signal 1000-1, or the signal 1000-N.

At 1308, another signal is modulated via the wireless communication chipset based on the second modulation type to produce a communication signal. For example, the controller 130 can cause, via the modulation operation signal 906, the I/Q modulator 902 to use the communication modulation to produce the signal 1000-2 or the signal 1000-N.

At 1310, the transmission of the radar signal and the communication signal is controlled to enable radar sensing and wireless communication via the wireless communication chipset. For example, the controller 310 can cause the wireless communication chipset 104 to transmit the radar signal 1000-1 and the communication signal 1000-2 at different times if the wireless communication chipset 104 has limited resources (e.g., a limited number of transceivers 406 and antennas 404). Alternatively, the controller 310 can cause the wireless communication chipset 104 to transmit the radar signal 1000-1 and the communication signal 1000-2 simultaneously, such as in cases that the wireless communication chipset 104 supports MIMO. In some cases, the transmission of the radar signal 1000-1 and the communication signal 1000-2 can be based on respective priorities, a pre-determined update rate of the radar sensing, or per a request by an application associated with the wireless communication chipset 104, such as the radar-based application 308.

Example Computing System

Figure 14:
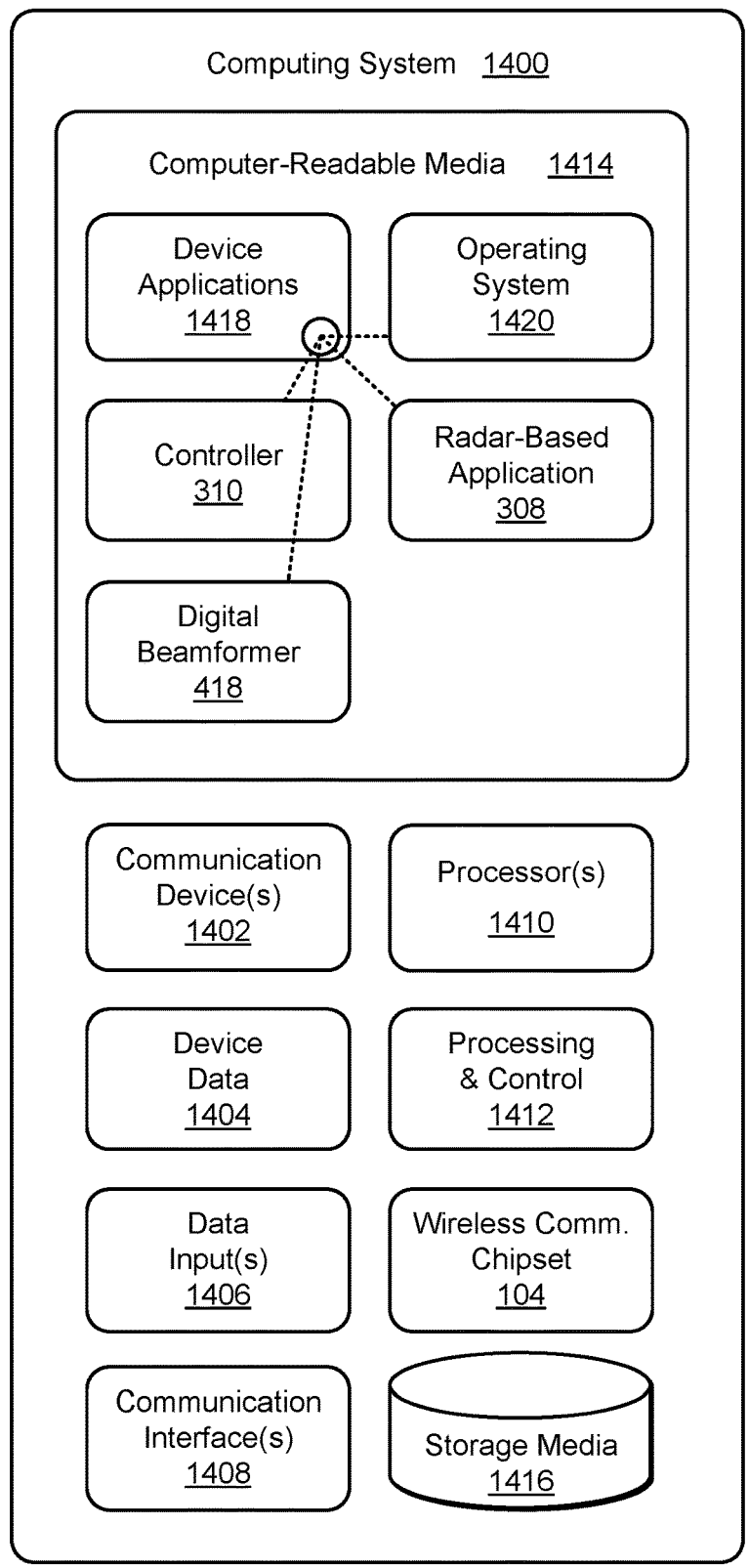
FIG. 14 illustrates an example computing system embodying, or in which techniques may be implemented that enable use of, a wireless communication chipset for radar sensing.

FIG. 14 illustrates various components of example computing system 1400 that can be implemented as any type of client, server, and/or computing device as described with reference to the previous FIGS. 1-10 to implement radar sensing using a wireless communication chipset 104 (wireless comm. chipset 104).

The computing system 1400 includes communication devices 1402 that enable wired and/or wireless communication of device data 1404 (e.g., received data, data that is being received, data scheduled for broadcast, data packets of the data). The device data 1404 or other device content can include configuration settings of the device, media content stored on the device, and/or information associated with a user of the device. Media content stored on the computing system 1400 can include any type of audio, video, and/or image data. The computing system 1400 includes one or more data inputs 1406 via which any type of data, media content, and/or inputs can be received, such as human utterances, baseband data 702, spatial responses 708, other types of radar data (e.g., digital baseband data or range-Doppler maps), user-selectable inputs (explicit or implicit), messages, music, television media content, recorded video content, and any other type of audio, video, and/or image data received from any content and/or data source.

The computing system 1400 also includes communication interfaces 1408, which can be implemented as any one or more of a serial and/or parallel interface, a wireless interface, any type of network interface, a modem, and as any other type of communication interface. The communication interfaces 1408 provide a connection and/or communication links between the computing system 1400 and a communication network by which other electronic, computing, and communication devices communicate data with the computing system 1400.

The computing system 1400 includes one or more processors 1410 (e.g., any of microprocessors, controllers, and the like), which process various computer-executable instructions to control the operation of the computing system 1400 and to enable techniques for, or in which can be embodied, radar sensing using the wireless communication chipset 104. Alternatively or in addition, the computing system 1400 can be implemented with any one or combination of hardware, firmware, or fixed logic circuitry that is implemented in connection with processing and control circuits which are generally identified at 1412. Although not shown, the computing system 1400 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The computing system 1400 also includes a computer-readable media 1414, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. The computing system 1400 can also include a mass storage media device (storage media) 1416.

The computer-readable media 1414 provides data storage mechanisms to store the device data 1404, as well as various device applications 1418 and any other types of information and/or data related to operational aspects of the computing system 1400. For example, an operating system 1420 can be maintained as a computer application with the computer-readable media 1414 and executed on the processors 1410. The device applications 1418 may include a device manager, such as any form of a control application, software application, signal-processing and control module, code that is native to a particular device, a hardware abstraction layer for a particular device, and so on.

The device applications 1418 also includes any system components, engines, or managers to implement radar sensing using the wireless communication chipset 104. In this example, device applications 1418 include the radar-based application 308, the controller 310, and the digital beamformer 418.

CONCLUSION

Although techniques using, and apparatuses including, radar sensing using a wireless communication chipset have been described in language specific to features and/or methods, it is to be understood that the subject of the appended claims is not necessarily limited to the specific features or methods described. Rather, the specific features and methods are disclosed as example implementations of radar sensing using the wireless communication chipset.

What is claimed is:

1. An apparatus comprising:
a wireless communication chipset including:
at least two antennas including a first antenna and a second antenna;
a transmitter coupled to the first antenna and configured to selectively:
transmit a wireless communication signal; or
transmit a radar signal;
a receiver configured to receive a reflected version of the radar signal; and
at least one first switch coupled between the receiver and the second antenna, the at least one first switch configured to selectively be in:
a closed state that connects the receiver to the second antenna; or
an open state that disconnects the receiver from the second antenna; and
a computer-readable storage media comprising computer-executable instructions that, responsive to execution by a processor, implement a controller configured to cause the at least one first switch to:
be in the open state during a first portion of time that the transmitter transmits the wireless communication signal; and
be in the closed state during at least a second portion of time that the transmitter transmits the radar signal.

2. The apparatus of claim 1, wherein:
the controller enables the wireless communication chipset to be operated as a continuous-wave radar during the second portion of time.

3. The apparatus of claim 2, wherein:
the wireless communication chipset includes at least one second switch coupled between the transmitter and the first antenna, the at least one second switch configured to selectively be in:
the closed state to connect the transmitter to the first antenna; or
the open state to disconnect the transmitter from the first antenna;
the receiver is configured to receive another communication signal during a third portion of time; and
the controller is configured to cause the at least one second switch to:
be in the closed state during the first portion of time and the second portion of time; and
be in the open state during the third portion of time.

4. The apparatus of claim 3, wherein the controller enables the wireless communication chipset to perform time-division duplexing during the first portion of time and the third portion of time for wireless communication.

5. The apparatus of claim 1, wherein the radar signal comprises a linear-frequency modulated signal.

6. The apparatus of claim 1, wherein:
the wireless communication chipset includes:
a third antenna of the at least two antennas;
another receiver configured to receive the reflected version of the radar signal; and
at least one third switch coupled between the other receiver and the third antenna, the at least one third switch configured to selectively be in:
the closed state to connect the other receiver to the third antenna; or
the open state to disconnect the other receiver from the third antenna; and
the controller is configured to cause the at least one third switch to:
be in the open state during the first portion of time that the transmitter transmits the wireless communication signal; and
be in the closed state during at least the second portion of time that the transmitter transmits the radar signal to enable the wireless communication chipset to support digital beamforming.

7. The apparatus of claim 1, wherein the transmitter and the receiver are associated with a same transceiver within the wireless communication chipset.

8. The apparatus of claim 1, wherein the transmitter and the receiver are associated with different transceivers within the wireless communication chipset.

9. An apparatus comprising:
a wireless communication chipset including:
at least one antenna including a first antenna;
a transmitter configured to selectively:
transmit a wireless communication signal; or
transmit a radar signal comprising multiple pulses;
a receiver configured to receive the multiple pulses of the radar signal;
at least one switch coupled to the transmitter, the receiver, and the first antenna, the at least one switch configured to selectively be in:
a first state that connects the transmitter to the first antenna and disconnects the receiver from the first antenna; or
a second state that disconnects the transmitter from the first antenna and connects the receiver to the first antenna; and
a computer-readable storage media comprising computer-executable instructions that, responsive to execution by a processor, implement a controller configured to cause the at least one switch to:
be in the first state to enable the transmitter to transmit the wireless communication signal during a first portion of time; and
alternate between the first state and the second state during a second portion of time to enable one pulse of the multiple pulses to be received by the receiver between a time that the transmitter transmits two other pulses of the multiple pulses.

10. The apparatus of claim 9, wherein:
the controller enables the wireless communication chipset to be operated as a pulse-Doppler radar during the second portion of time.

11. The apparatus of claim 10, wherein:
the multiple pulses are reflected by a target; and
the computer-readable storage media comprises other computer-executable instructions that, responsive to execution by the processor, implement a radar-based application configured to determine, based on the multiple pulses that are received, a range or a range rate of the target.

12. The apparatus of claim 9, wherein the transmitter and the receiver are associated with a same transceiver within the wireless communication chipset.

13. The apparatus of claim 9, wherein the transmitter and the receiver are associated with different transceivers within the wireless communication chipset.

14. A method comprising:
causing a transmitter of a wireless communication chipset to be connected to a first antenna;
transmitting a wireless communication signal via the transmitter and the first antenna;
causing a receiver of the wireless communication chipset to be disconnected from a second antenna during a first portion of time that the transmitter transmits the wireless communication signal;
transmitting a radar signal via the transmitter and the first antenna;
causing the receiver of the wireless communication chipset to be connected to the second antenna during at least a second portion of time that the transmitter transmits the radar signal;
receiving the radar signal that is reflected by a target via the receiver and the second antenna; and
processing the radar signal that is received to determine a location of the target.

15. The method of claim 14, wherein the causing of the receiver to be connected to the second antenna during the second portion of time enables full-duplex operation of the wireless communication chipset for radar sensing.

16. The method of claim 15, wherein the radar signal is a continuous-wave radar signal.

17. The method of claim 15, wherein the radar signal is a pulsed radar signal.

18. The method of claim 14, further comprising:
causing the receiver to be connected to the second antenna;
receiving, via the receiver, another communication signal during a third portion of time; and
causing the transmitter to be disconnected from the first antenna during the third portion of time.

19. The method of claim 18, wherein the causing of the transmitter to be disconnected during the third portion of time and the causing of the receiver to be disconnected during the first portion of time enables half-duplex operation of the wireless communication chipset for wireless communication.

20. The method of claim 14, further comprising:
causing another receiver of the wireless communication chipset to be connected to a third antenna during the second time interval;
receiving, via the other receiver, the radar signal that is reflected by the target; and
performing digital beamforming based on the radar signal that is received via the receiver and the other receiver to determine an angular position of the target.

* * * * *